United States Patent
Webb et al.

(10) Patent No.: US 11,629,094 B2
(45) Date of Patent: *Apr. 18, 2023

(54) FLEXIBLE CERAMIC COATINGS FOR METALS AND METHODS OF MAKING SAME

(71) Applicant: ZYP Coatings, Inc., Oak Ridge, TN (US)

(72) Inventors: William Brent Webb, Oak Ridge, TN (US); Cressie E. Holcombe, Jr., Oak Ridge, TN (US)

(73) Assignee: ZYP Coatings, Inc., Oak Ridge, TN (US)

( * ) Notice: Subject to any disclaimer, the term of this patent is extended or adjusted under 35 U.S.C. 154(b) by 1358 days.

This patent is subject to a terminal disclaimer.

(21) Appl. No.: 15/906,361

(22) Filed: Feb. 27, 2018

(65) Prior Publication Data

US 2019/0263714 A1    Aug. 29, 2019

(51) Int. Cl.

| | |
|---|---|
| *C03C 8/14* | (2006.01) |
| *C03C 8/02* | (2006.01) |
| *C03C 3/089* | (2006.01) |
| *C03C 3/064* | (2006.01) |
| *C23D 5/04* | (2006.01) |
| *C23D 5/02* | (2006.01) |
| *C03C 3/11* | (2006.01) |
| *C09D 1/02* | (2006.01) |
| *C09D 1/00* | (2006.01) |

(52) U.S. Cl.
CPC ............... *C03C 8/14* (2013.01); *C03C 3/064* (2013.01); *C03C 3/089* (2013.01); *C03C 3/111* (2013.01); *C03C 8/02* (2013.01); *C09D 1/00* (2013.01); *C09D 1/02* (2013.01); *C23D 5/02* (2013.01); *C23D 5/04* (2013.01); *C03C 2207/04* (2013.01); *C03C 2207/06* (2013.01)

(58) Field of Classification Search
CPC ............ C03C 2207/04; C03C 2207/06; C03C 3/064; C03C 3/089; C03C 3/111; C03C 8/02; C03C 8/14; C09D 1/00; C09D 1/02; C23D 5/02; C23D 5/04

See application file for complete search history.

(56) References Cited

U.S. PATENT DOCUMENTS

| | | | | |
|---|---|---|---|---|
| 3,832,224 | A | * 8/1974 | Brown | ................ C04B 41/5022 501/67 |
| 4,997,698 | A | * 3/1991 | Oboodi | ..................... C03C 8/02 428/209 |
| 2017/0107379 | A1 | * 4/2017 | Hamm | .................... C03C 17/22 |

* cited by examiner

*Primary Examiner* — Frances Tischler
(74) *Attorney, Agent, or Firm* — Nexsen Pruet, LLC; John B. Hardaway, III (57) ABSTRACT

Bulk paint and ceramic powder systems, methods of forming same, and methods of forming a flexible ceramic coating on a metal substrate are disclosed. The systems may include a ceramic composition having between 2 to 30 weight percent of an alkali metal oxide, such as $K_2O$, $Na_2O$, and $Li_2O$ or mixtures thereof, between 10 to 74 weight percent $SiO_2$, and between 23 to 79 weight percent $B_2O_3$. Additives that are nonwetting with molten metals, such as boron nitride, provide durable coatings for metal processing operations. The ceramic composition may include less than 5 weight percent additional metal oxides. The bulk paint system further may include water and a cellulosic suspension agent to form a bulk paint. The ceramic powder system may be processed to form a uniform powder. The bulk paint or uniform powder may be applied to a metal substrate, such as a ferrous metal substrate, dried, and heated to form a flexible coating on the metal substrate.

10 Claims, 1 Drawing Sheet

FLEXIBLE CERAMIC COATINGS FOR METALS AND METHODS OF MAKING SAME

BACKGROUND

The present invention relates generally to the field of ceramic coatings and methods of making ceramic coatings. More particularly, the present invention relates to bulk paint and powder systems that form ceramic composition based coatings on the surface of metals, such as ferrous metal substrates, after high temperature heating.

The present invention also relates to methods of forming the ceramic composition based coating on metal substrates. The coatings of the present invention have various uses and are preferably flexible, durable, hard, and dense.

SUMMARY

The present invention includes a ceramic composition based coating system and method of making same as well as a bulk paint system that forms a ceramic composition based coating of the present invention. In one embodiment of the invention, the ceramic composition based coating system includes a metal substrate and a coating adhered to the metal substrate. In an embodiment of the present invention, the coating includes a $R_2O$—$SiO_2$—$B_2O_3$ composition having between 2 to 30 weight percent $R_2O$, wherein $R_2O$ is an alkali metal oxide, between 10 to 74 weight percent $SiO_2$ (silicon oxide or silicon dioxide), and between 23 to 79 weight percent $B_2O_3$ (boron oxide). In certain embodiments of the present invention, the alkali metal oxide or $R_2O$ of the $R_2O$—$SiO_2$—$B_2O_3$ composition is $K_2O$ (potassium oxide), $Na_2O$ (sodium oxide), $Li_2O$ (lithium oxide), or combinations thereof. Further, the metal substrate may be a ferrous metal substrate.

In an alternative embodiment, the coating of the ceramic composition based coating system of the present invention includes a $R_2O$—$SiO_2$—$B_2O_3$ composition having between 7 to 30 weight percent $R_2O$, wherein $R_2O$ is an alkali metal oxide, between 10 to 70 weight percent $SiO_2$, and between 23 to 65 weight percent $B_2O_3$. In yet a further alternative embodiment, the coating includes a $R_2O$—$SiO_2$—$B_2O_3$ composition having between 9 to 29 weight percent $R_2O$, wherein $R_2O$ is an alkali metal oxide, between 21 to 53 weight percent $SiO_2$, and between 31 to 64 weight percent $B_2O_3$. In another embodiment of the present invention, the coating includes a $R_2O$—$SiO_2$—$B_2O_3$ composition having between 11 to 25 weight percent $R_2O$, wherein $R_2O$ is an alkali metal oxide, between 24 to 47 weight percent $SiO_2$, and between 35 to 58 weight percent $B_2O_3$.

In an embodiment of the ceramic composition based coating system of the present invention, the coating includes boron nitride. For example, the coating may include between 3 to 50 weight percent boron nitride and 50 to 97 weight percent $R_2O$—$SiO_2$—$B_2O_3$ composition. Alternatively, the coating may include between 10 to 30 weight percent boron nitride and 70 to 90 weight percent $R_2O$—$SiO_2$—$B_2O_3$ composition. Further alternatively, the coating may include at least 20 weight percent boron nitride and up to 80 weight percent $R_2O$—$SiO_2$—$B_2O_3$ composition. Moreover, the coating may include additives, such as $ZrO_2$, $Al_2O_3$, $CeO_2$, $MgAl_2O_4$, $Al_2TiO_5$, $Y_2O_3$, $HfO_2$, $Si_3N_4$, NiAl, $Ni_3Al$, TiAl, $TiAl_3$, SiAlON, Y—SiAlON, alpha SiAlON, $CaZrO_3$, and $TiB_2$. The coating and/or coating system of the present invention may be flexible.

The present invention also includes a method of forming a ceramic composition based coating on a metal substrate. In one embodiment, the method includes the steps of providing a raw material component mixture, applying the raw material component mixture to a metal substrate to form a coated substrate; and heating the coated substrate to at least 800° Celsius for at least one hour to form a ceramic composition based coating on the metal substrate. In one embodiment, the ceramic composition based coating includes a $R_2O$—$SiO_2$—$B_2O_3$ composition as set forth herein. For example, the $R_2O$—$SiO_2$—$B_2O_3$ composition may have between 2 to 30 weight percent $R_2O$, wherein $R_2O$ is an alkali metal oxide, between 10 to 74 weight percent $SiO_2$, and between 23 to 79 weight percent $B_2O_3$. After heating, the ceramic composition based coating preferably adheres to the metal substrate.

In an embodiment of the method of forming a ceramic composition based coating on a metal substrate, the method may further include the step of forming the raw material component mixture by combining raw material components with water and a cellulosic suspension agent to form a bulk paint. The bulk paint may be applied to the metal substrate to form the coated substrate. The method of forming a ceramic composition based coating on a metal substrate may also include the step of ball-milling the bulk paint prior to application of the bulk paint to the metal substrate.

In an alternative embodiment of the method of forming a ceramic composition based coating on a metal substrate, the raw material component mixture may be a dry powder mixture that may be applied directly on the metal substrate to form the coated substrate.

In an embodiment of the method of forming a ceramic composition based coating on a metal substrate, the raw material component mixture may include boron nitride powder. Further, in an embodiment of the method of forming a ceramic composition based coating on a metal substrate, the ceramic composition based coating may include boron nitride.

In an embodiment of the method of forming a ceramic composition based coating on a metal substrate, the raw material component mixture may include aluminum oxide ($Al_2O_3$). For example, the raw material mixture may include 1 to 5 weight percent $Al_2O_3$.

In an embodiment of the method of forming a ceramic composition based coating on a metal substrate, the raw material component mixture may include potassium tetraborate powder, ammonium pentaborate powder, and silica. In another embodiment of the method of forming a ceramic composition based coating on a metal substrate, the raw material component mixture may include potassium silicate and ammonium pentaborate powder. In yet another embodiment of the method of forming a ceramic composition based coating on a metal substrate, the raw material component mixture may include potassium tetraborate powder, potassium hydroxide solution, silica, and boron nitride powder. Alternatively, the raw material component mixture may include potassium tetraborate powder, potassium silicate, silica, and boron nitride powder. Further alternatively, the raw material component mixture may include potassium silicate and boron nitride powder.

In an embodiment of the method of forming a ceramic composition based coating on a metal substrate, the method may further include the step of processing the raw material component mixture before applying to a metal substrate. For example, the step of processing the raw material component mixture may include milling the raw material component mixture. Alternatively, the step of processing the raw material component mixture may include heating the raw material component mixture to between 800-1300° Celsius and then grinding. Further, the step of processing the raw material component mixture may further include quenching before grinding. In yet a further alternative, the step of processing the raw material component mixture may include calcining the raw material component mixture at 600-700° Celsius and then grinding.

In an alternative embodiment of the method of forming a ceramic composition based coating on a metal substrate, the method includes the steps of providing a boron nitride bulk paint system, wherein the bulk paint system includes boron nitride powder; providing a metal substrate; applying the bulk paint system to the metal substrate to form a painted substrate; oxidizing boron nitride from the bulk paint system by heating the painted substrate in an air atmosphere at a temperature of at least 800° Celsius for at least one hour; and forming a coating on the metal substrate, wherein the coating comprises a $R_2O$—$SiO_2$—$B_2O_3$ composition, and wherein $R_2O$ is an alkali metal oxide. In one embodiment, the ceramic composition based coating includes a $R_2O$—$SiO_2$—$B_2O_3$ composition having between 2 to 30 weight percent $R_2O$, wherein $R_2O$ is an alkali metal oxide, between 10 to 74 weight percent $SiO_2$, and between 23 to 79 weight percent $B_2O_3$.

In an embodiment of the method of forming a ceramic composition based coating on a metal substrate, the step of oxidizing boron nitride from the boron nitride based slurry by heating the painted substrate in an air atmosphere is at a temperature of 800-1200° Celsius for no more than four days.

In an embodiment of the method of forming a ceramic composition based coating on a metal substrate, the method may further include the step of processing the boron nitride bulk paint system, using the processing techniques as set forth herein, before applying to the metal substrate.

The present invention further includes a bulk paint system. The bulk paint system may include water, a suspender, and raw materials derived from precursors of alkali oxides, silica, and boron oxide. In one embodiment, the bulk paint system after heating to at least 800° Celsius for at least one hour forms a coating having a $R_2O$—$SiO_2$—$B_2O_3$ composition. For example, the $R_2O$—$SiO_2$—$B_2O_3$ composition may include between 2 to 30 weight percent $R_2O$, wherein $R_2O$ is an alkali metal oxide, between 10 to 74 weight percent $SiO_2$, and between 23 to 79 weight percent $B_2O_3$.

In an embodiment of the bulk paint system of the present invention, the raw materials may include potassium silicate and boron nitride powder. For example, the bulk paint may include 30-40 weight percent water, 1-5 weight percent cellulosic suspender, 48-56 weight percent potassium silicate solution as a first raw material, and 12-14 weight percent boron nitride powder as a second raw material. Alternatively, the raw materials may include one or more of potassium tetraborate powder, ammonium pentaborate powder, potassium hydroxide solution, silica powder, colloidal silica, boric acid, potassium silicate powder, potassium silicate solution, potassium carbonate, and boron nitride powder. In one embodiment, the raw materials may include a combination of potassium tetraborate powder, ammonium pentaborate powder, and silica. In another embodiment, the raw materials include a combination of potassium silicate and ammonium pentaborate powder. In yet another embodiment, the raw materials may include a combination of potassium tetraborate powder, potassium hydroxide solution, silica, and boron nitride powder. And in yet a further alternative embodiment, the raw materials include a combination of potassium tetraborate powder, potassium silicate, silica, and boron nitride powder.

In one embodiment of the bulk paint system of the present invention, the bulk paint system may include one or more additives such as $ZrO_2$, $Al_2O_3$, $CeO_2$, $MgAl_2O_4$, $Al_2TiO_5$, $Y_2O_3$, $HfO_2$, $Si_3N_4$, NiAl, $Ni_3Al$, TiAl, $TiAl_3$, SiAlON, Y—SiAlON, alpha SiAlON, $CaZrO_3$, and $TiB_2$.

DETAILED DESCRIPTION OF REPRESENTATIVE EMBODIMENTS

The present invention relates to the field of ceramic coatings and method for making same. More particularly, the present invention relates to bulk paint and powder systems that form ceramic composition based coatings on the surface of metals, such as ferrous metal substrates, after high temperature heating, as well as method of making such coatings. The coatings may include boron nitride or other components to enhance the properties of the coatings, such as to allow for non-wetting of the coating with molten aluminum. The coatings of the present invention are preferably flexible, tough, hard, and dense. The components of the coatings, bulk paints, and powder systems of the present invention and methods related to same may be varied to provide desired coating properties.

As stated herein, the coatings of the present invention have various uses. For example, the coatings of the present invention may be particularly useful to aid in protecting surfaces, such as ferrous metal surfaces, from wear caused by turbulent molten aluminum. Additionally, the coatings of the present invention may be particularly useful for providing release coatings in molds used for die casting. Further, the bendability and high heat tolerance properties of the coatings of the present invention may allow for additional beneficial uses. The coatings of the present invention may incorporate various components to improve heat tolerance, flowability, non-wetting, and/or adherence properties of the coating. The coatings of the present invention may be flexible.

In one embodiment of the ceramic composition based coating system of the present invention, the system may include a metal substrate and a coating adhered to the metal substrate. The coating may include a $R_2O$—$SiO_2$—$B_2O_3$ composition having between 2 to 30 weight percent $R_2O$, wherein $R_2O$ is an alkali metal oxide, between 10 to 74 weight percent $SiO_2$ (silicon oxide or silicon dioxide), and between 23 to 79 weight percent $B_2O_3$ (boron oxide). In certain embodiments of the present invention, the alkali metal oxide or $R_2O$ of the $R_2O$—$SiO_2$—$B_2O_3$ composition is $K_2O$ (potassium oxide), $Na_2O$ (sodium oxide), $Li_2O$ (lithium oxide), or a combinations thereof. For example, the alkali metal oxide may be $K_2O$, $Na_2O$, $Li_2O$, $K_2O+Na_2O$, $K_2O+Li_2O$, $Na_2O+Li_2O$, and $K_2O+Na_2O+Li_2O$.

In an alternative embodiment of the present invention, the coating of the ceramic composition based coating system may include a $R_2O$—$SiO_2$—$B_2O_3$ composition having between 7 to 30 weight percent $R_2O$, wherein $R_2O$ is an alkali metal oxide, between 10 to 70 weight percent $SiO_2$, and between 23 to 65 weight percent $B_2O_3$. In yet a further alternative embodiment, the coating may include a $R_2O$—

$SiO_2$—$B_2O_3$ composition having between 9 to 29 weight percent $R_2O$, wherein $R_2O$ is an alkali metal oxide, between 21 to 53 weight percent $SiO_2$, and between 31 to 64 weight percent $B_2O_3$. In another embodiment of the present invention, the coating may include a $R_2O$—$SiO_2$—$B_2O_3$ composition having between 11 to 25 weight percent $R_2O$, wherein $R_2O$ is an alkali metal oxide, between 24 to 47 weight percent $SiO_2$, and between 35 to 58 weight percent $B_2O_3$.

In an embodiment of the present invention, the coating may include a $R_2O$—$SiO_2$—$B_2O_3$ composition having between 12 to 23 weight percent $K_2O$, between 30 to 39 weight percent $SiO_2$, and between 40 to 52 weight percent $B_2O_3$. In an alternative embodiment, the coating may include a $R_2O$—$SiO_2$—$B_2O_3$ composition having between 16 to 19 weight percent $K_2O$, between 31 to 36 weight percent $SiO_2$, and between 47 to 51 weight percent $B_2O_3$. In yet a further alternative embodiment, the coating may include a $R_2O$—$SiO_2$—$B_2O_3$ composition having between 16 to 18 weight percent $K_2O$, between 35 to 37 weight percent $SiO_2$, and between 46 to 48 weight percent $B_2O_3$.

The embodiments of the preceding paragraph incorporate $K_2O$ as the alkali metal oxide $R_2O$ component. Alternatively, alkali metal oxides of $Na_2O$, $Li_2O$, or combinations thereof may be substituted for or combined with $K_2O$ in the same molar level equivalent to the weight percent of $K_2O$ set forth in the above embodiments. For example, the molecular weight of $K_2O$ is 94.2, $Na_2O$ is 62, $Li_2O$ is 29.9, $SiO_2$ is 60.1, and $B_2O_3$ is 69.6. Thus, in a system of $R_2O*SiO_2*B_2O_3$, where R is K, Na, and/or Li, 10 weight percent $K_2O$ is 0.106 moles of $K_2O$ (10/94.2=0.106) and would be equivalent to 6.6 weight percent $Na_2O$ (0.106× 62=6.6) and 3.2 weight percent $Li_2O$ (0.106×29.9=3.2). $Na_2O$ may therefore be substituted for $K_2O$ in the examples set forth herein at approximately ⅔ of the weight percent of $K_2O$. Likewise, $Li_2O$ may be substituted for $K_2O$ in the examples set forth herein at approximately ⅓ of the weight percent of $K_2O$. Table A below sets forth example compositions of the present invention incorporating the alternative alkali metal oxides at equivalent molar levels.

weight percent $R_2O$—$SiO_{2}$—$_{B_2O_3}$ composition. Alternatively, the coating may include between 10 to 30 weight percent boron nitride and 70 to 90 weight percent $R_2O$—$SiO_2$—$B_2O_3$ composition. Further alternatively, the coating may include at least 20 weight percent boron nitride and up to 80 weight percent $R_2O$—$SiO_2$—$B_2O_3$ composition. Moreover, the coating may include additives, such as zirconium oxide ($ZrO_2$), aluminum oxide ($Al_2O_3$), cerium oxide ($CeO_2$), magnesium aluminate ($MgAl_2O_4$), aluminum titanate ($Al_2TiO_5$), yttrium oxide ($Y_2O_3$), hafnium oxide ($HfO_2$), silicon nitride ($Si_3N_4$), nickel aluminides (NiAl or $Ni_3Al$), titanium aluminides (TiAl or $TiAl_3$), silicon aluminum oxynitride (SiAlON), yttrium silicon aluminum oxynitride (Y—SiAlON or alpha SiAlON), and calcium zirconate ($CaZrO_3$), and titanium diboride ($TiB_2$).

In one embodiment of the ceramic composition based coating system of the present invention, the metal substrate may be a ferrous metal substrate. Example ferrous metal substrates used in connection with the present invention include, but are not limited to, stainless steel 304 (18-20% chromium (Cr); 8-12% nickel (Ni); max 2% manganese (Mn); max 0.75% silicon (Si); max 0.1% nitrogen (N); max 0.08% carbon (C); max 0.045% phosphorous (P); max 0.03% sulfur (S); balance iron (Fe)), stainless steel 310 (24-26% chromium; max 0.25% carbon; 19-22% nickel); stainless steel 316 (17% chromium; 12% nickel; 2.5% molybdenum (Mo); 2% manganese; 1% silicon; 0.08% carbon; 0.045% phosphorous; 0.03% sulfur; balance iron), stainless steel 430 (16-18% chromium; max 1% silicon; max 1% manganese; max 0.5% nickel; max 0.12% carbon; max 0.04% phosphorous; max 0.03% sulfur; balance iron), stainless steel 439, Haynes alloy 214 (75% nickel; 16% chromium; 4.5% aluminum; 3% iron; max 0.5% manganese; max 0.2% silicon; max 0.1% zirconium (Zr); 0.05% carbon; max 0.01% boron (B); 0.01% yttrium (Y)), and Inconel 718 (50% nickel; 17% chromium; 4.75% niobium/tantalum; 2.8% molybdenum; 0.65% titanium; 0.2% aluminum; balance iron). Additional alternative substrate materials include cast iron, such as Ni-hard cast iron, white cast iron HC15,

TABLE A

|  | $K_2O$ Composition | $Na_2O$ Composition | $Li_2O$ Composition |
|---|---|---|---|
| Weight Percent | 17.0 wt. % $K_2O$ | 11.9 wt. % $Na_2O$ | 6.1 wt. % $Li_2O$ |
|  | 35.6 wt. % $SiO_2$ | 37.8 wt. % $SiO_2$ | 40.3 wt. % $SiO_2$ |
|  | 47.3 wt. % $B_2O_3$ | 50.3 wt. % $B_2O_3$ | 53.6 wt. % $B_2O_3$ |
| Molar Ratio | 17.0/94.2 = 0.18 $K_2O$ | 11.9/62.0 = 0.19 $Na_2O$ | 6.10/29.9 = 0.20 $Li_2O$ |
|  | 35.6/60.1 = 0.59 $SiO_2$ | 37.8/60.1 = 0.63 $SiO_2$ | 40.3/60.1 = 0.67 $SiO_2$ |
|  | 47.3/69.6 = 0.68 $B_2O_3$ | 50.3/69.6 = 0.72 $B_2O_3$ | 53.6/69.6 = 0.77 $B_2O_3$ |
| Sum | 1.45 | 1.54 | 1.64 |
| Molar Percent | 0.18/1.45 = 12.4 $K_2O$ | 0.19/1.54 = 12.3 $Na_2O$ | 0.20/1.64 = 12.2 $Li_2O$ |
|  | 0.59/1.45 = 40.7 $SiO_2$ | 0.63/1.54 = 40.9 $SiO_2$ | 0.67/1.64 = 40.9 $SiO_2$ |
|  | 0.68/1.45 = 46.9 $B_2O_3$ | 0.72/1.54 = 46.8 $B_2O_3$ | 0.77/1.64 = 47.0 $B_2O_3$ |
| Sum | 100 | 100 | 100 |

In one embodiment of the ceramic composition based coating system of the present invention, the coating may include at least 50 weight percent $R_2O$—$SiO_2$—$B_2O_3$ composition. Alternatively, the coating may include at least 70 weight percent $R_2O$—$SiO_2$—$B_2O_3$ composition. In yet a further alternative, the coating may include at least 90 weight percent $R_2O$—$SiO_2$—$B_2O_3$ composition.

In an embodiment of the ceramic composition based coating system of the present invention, the coating may include boron nitride. For example, the coating may include between 3 to 50 weight percent boron nitride and 50 to 97 white cast iron HC28, which may incorporate chromium or a chrome primer coating. Alternatively, steel, such as plain carbon steel, H13 tool steel, or chrome-plated steel may be used. Preferably, the substrate material includes at least 12 weight percent chromium. More preferably, the substrate material includes at least 15 weight percent chromium. Even more preferably, the substrate material includes at least 16 weight percent chromium.

In one embodiment of the present invention, the thickness of the ceramic coating of the present invention may be approximately 0.0005 to 0.004 inches. In an alternative embodiment, the thickness of the ceramic coating may be approximately 0.001 to 0.003 inches. In a further embodiment, the thickness of the ceramic coating may be approximately 0.002 inches.

The present invention also includes a method of forming a ceramic composition based coating on a metal substrate. The method may include the steps of providing a raw material component mixture, applying the raw material component mixture to a metal substrate to form a coated substrate, and heating the coated substrate to at least 800° Celsius for at least one hour to form a ceramic composition based coating on the metal substrate. In one embodiment, the ceramic composition based coating includes a $R_2O$—$SiO_2$—$B_2O_3$ composition having between 2 to 30 weight percent $R_2O$, wherein $R_2O$ is an alkali metal oxide, between 10 to 74 weight percent $SiO_2$, and between 23 to 79 weight percent $B_2O_3$. In an alternative embodiment, the ceramic composition based coating includes a $R_2O$—$SiO_2$—$B_2O_3$ composition having between 7 to 30 weight percent $R_2O$, wherein $R_2O$ is an alkali metal oxide, between 10 to 70 weight percent $SiO_2$, and between 23 to 64 weight percent $B_2O_3$. In yet a further alternative embodiment, the ceramic composition based coating includes a $R_2O$—$SiO_2$—$B_2O_3$ composition having between 9 to 29 weight percent $R_2O$, wherein $R_2O$ is an alkali metal oxide, between 21 to 53 weight percent $SiO_2$, and between 31 to 64 weight percent $B_2O_3$. After heating, the ceramic composition based coating preferably adheres to or fuses with the metal substrate. The step of adhering or fusing the coating to the metal substrate may be done in numerous environments. For example, the coating may be fused to the metal substrate in an air, argon, inert, and/or nitrogen atmosphere.

The method of forming a ceramic composition based coating on a metal substrate may further include the step of forming the raw material component mixture by combining raw material components with water and a cellulosic suspension agent to form a bulk paint. The bulk paint may be applied to the metal substrate to form the coated substrate. In one embodiment, the water may be 60-80° Celsius when combining the raw material components with the water. Further, the bulk paint may include between 5 to 75 weight percent water and 1 to 5 weight percent cellulosic suspension agent. In another embodiment, the bulk paint includes between 10 to 50 weight percent water and 1 to 10 weight percent cellulosic suspension agent. In a further embodiment of the present invention, the bulk paint includes between 25 to 95 weight percent raw material components. In another embodiment, the bulk paint includes between 50 to 90 weight percent raw material components. The method of forming a ceramic composition based coating on a metal substrate may also include the step of ball-milling the bulk paint prior to application of the bulk paint to the metal substrate.

In an embodiment of the method of forming a ceramic composition based coating on a metal substrate, the raw material component mixture may be a dry powder mixture that may be applied directly to the metal substrate to form the coated substrate.

In an embodiment of the method of forming a ceramic composition based coating on a metal substrate, the raw material component mixture may include boron nitride powder. Further, in an embodiment of the method of forming a ceramic composition based coating on a metal substrate, the ceramic composition based coating may include boron nitride. For example, the ceramic composition based coating may include 3 to 50 weight percent boron nitride. Alternatively, the ceramic composition based coating may include 10 to 30 weight percent boron nitride. In yet a further alternative, the ceramic composition based coating may include 20 to 25 weight percent boron nitride.

In an embodiment of the method of forming a ceramic composition based coating on a metal substrate, the raw material component mixture may include aluminum oxide ($Al_2O_3$). For example, the raw material mixture may include 1 to 5 weight percent $Al_2O_3$.

In an embodiment of the method of forming a ceramic composition based coating on a metal substrate, the raw material component mixture may include potassium tetraborate powder, ammonium pentaborate powder, and silica. In another embodiment of the method of forming a ceramic composition based coating on a metal substrate, the raw material component mixture may include potassium silicate and ammonium pentaborate powder. In yet another embodiment of the method of forming a ceramic composition based coating on a metal substrate, the raw material component mixture may include potassium tetraborate powder, potassium hydroxide solution, silica, and boron nitride powder. Alternatively, the raw material component mixture may include potassium tetraborate powder, potassium silicate, silica, and boron nitride powder. Further alternatively, the raw material component mixture may include potassium silicate and boron nitride powder.

In an embodiment of the method of forming a ceramic composition based coating on a metal substrate, the method may further include the step of processing the raw material component mixture before applying to a metal substrate. For example, a process, such as milling, heating, quenching, calcining, and/or grinding as discussed herein, may be applied to the raw material components. Such processing may occur either before or after combining the raw material components with the cellulosic suspension agent, water, and/or boron nitride powder to form a bulk paint system. In one embodiment, the step of processing the raw material component mixture may include milling the raw material component mixture. Alternatively, the step of processing the raw material component mixture may include heating the raw material component mixture to between 800-1300° Celsius and then grinding. Further, the step of processing the raw material component mixture may further include quenching before grinding. In yet a further alternative, the step of processing the raw material component mixture may include calcining the raw material component mixture at 600-700° Celsius and then grinding.

In an embodiment of the method of forming a ceramic composition based coating on a metal substrate, the metal substrate may be a ferrous metal substrate. Further, in an embodiment of the method of the forming a ceramic composition based coating on a metal substrate, the coated substrate may be heated in an argon, inert, or nitrogen atmosphere.

In an alternative embodiment of the method of forming a ceramic composition based coating on a metal substrate, the method includes the steps of providing a boron nitride bulk paint system, wherein the bulk paint system includes boron nitride powder; providing a metal substrate; applying the bulk paint system to the metal substrate to form a painted substrate; oxidizing boron nitride from the bulk paint system by heating the painted substrate in an air atmosphere at a temperature of at least 800° Celsius for at least one hour; and forming a coating on the metal substrate, wherein the coating comprises a $R_2O$—$SiO_2$—$B_2O_3$ composition, and wherein $R_2O$ is an alkali metal oxide. In one embodiment, the ceramic composition based coating includes a $R_2O$—$SiO_2$—$B_2O_3$ composition having between 2 to 30 weight percent $R_2O$, wherein $R_2O$ is an alkali metal oxide, between 10 to 74 weight percent $SiO_2$, and between 23 to 79 weight percent $B_2O_3$.

In an embodiment of the method of forming a ceramic composition based coating on a metal substrate, the boron nitride bulk paint system may include 48-56 weight percent potassium silicate solution, 12-14 weight percent boron nitride powder, and 30-40 weight percent water having 1-5 weight percent cellulosic suspender.

In an embodiment of the method of forming a ceramic composition based coating on a metal substrate, the step of oxidizing boron nitride from the boron nitride based slurry by heating the painted substrate in an air atmosphere is at a temperature of 800-1200° Celsius for no more than four days.

In an embodiment of the method of forming a ceramic composition based coating on a metal substrate, 18-22 weight percent of the boron nitride powder of the bulk paint system may remain unoxidized. Alternatively, the boron nitride powder of the bulk paint system may be completely oxidized.

In an embodiment of the method of forming a ceramic composition based coating on a metal substrate, the method may further include the steps of providing additional oxides, nitrides, and/or intermetallics and combining such additional oxides with the boron nitride bulk paint system to form a modified bulk paint system for application to the metal substrate. In one embodiment, the additional oxides or nitrides may include one or more of boron nitride, silicon nitride, zirconium oxide, aluminum oxide, cerium oxide, magnesium aluminate, aluminum titanate, yttrium oxide, and hafnium oxide. The additional intermetallics may include TiAl, $TiAl_3$, NiAl, and $Ni_3Al$. Further, the additional oxides, nitrides, or intermetallics may compose 20-50 weight percent of the modified bulk paint system.

In an embodiment of the method of forming a ceramic composition based coating on a metal substrate, the method may further include the step of processing the boron nitride bulk paint system before applying to the metal substrate. In one embodiment, the step of processing the boron nitride bulk paint system may include milling the bulk paint system. Alternatively, the step of processing the boron nitride paint system may include heating the bulk paint system to between 800-1300° Celsius and then grinding. Further alternatively, the step of processing the boron nitride paint system may include calcining the bulk paint system at 600-700° Celsius to form a calcined system and then grinding the calcined system.

The present invention further includes a bulk paint system. The bulk paint system may include water, a suspender, and raw materials derived from precursors of alkali oxides, silica, and boron oxide. In one embodiment, the bulk paint system after heating to at least 800° Celsius for at least one hour forms a coating having a $R_2O$—$SiO_2$—$B_2O_3$ composition. For example, the $R_2O$—$SiO_2$—$B_2O_3$ composition may include between 2 to 30 weight percent $R_2O$, wherein $R_2O$ is an alkali metal oxide, between 10 to 74 weight percent $SiO_2$, and between 23 to 79 weight percent $B_2O_3$.

In an embodiment of the bulk paint system of the present invention, the raw materials may include potassium silicate and boron nitride powder. For example, the bulk paint may include 30-40 weight percent water, 1-5 weight percent cellulosic suspender, 48-56 weight percent potassium silicate solution as a first raw material, and 12-14 weight percent boron nitride powder as a second raw material. Alternatively, the raw materials may include one or more of potassium tetraborate powder, ammonium pentaborate powder, potassium hydroxide solution, silica powder, colloidal silica, boric acid, potassium silicate powder, potassium silicate solution, potassium carbonate, and boron nitride powder. In one embodiment, the raw materials may include a combination of potassium tetraborate powder, ammonium pentaborate powder, and silica. In another embodiment, the raw materials include a combination of potassium silicate and ammonium pentaborate powder. In yet another embodiment, the raw materials may include a combination of potassium tetraborate powder, potassium hydroxide solution, silica, and boron nitride powder. And in yet a further alternative embodiment, the raw materials include a combination of potassium tetraborate powder, potassium silicate, silica, and boron nitride powder.

In one embodiment of the bulk paint system of the present invention, the bulk paint system may include 1 to 5 weight percent $Al_2O_3$. Alternatively, the bulk paint system may include 1 to 2 weight percent $Al_2O_3$. When $Al_2O_3$ is incorporated into the bulk paint, dry powder mixture, or boron nitride bulk paint system of the present invention, the melting and fusing temperature of the coating may increase. Thus, the coating may be heated to approximately between 1100-1400° Celsius to create a bonded flexible coating of the present invention.

In a further embodiment of the bulk paint system of the present invention, the bulk paint system may include one or more additives. For example, the bulk paint system may include $ZrO_2$, $Al_2O_3$, $CeO_2$, $MgAl_2O_4$, $Al_2TiO_5$, $Y_2O_3$, $HfO_2$, $Si_3N_4$, NiAl, $Ni_3Al$, TiAl, $TiAl_3$, SiAlON, Y—SiAlON, alpha SiAlON, $CaZrO_3$, and $TiB_2$. Essentially any oxide or mixed oxide that is stable in a pH-alkaline liquid may be utilized as an addition to the bulk paint system to modify the performance of the coating. When the raw material components are processed such as by making a frit or calcining the powders, however, additives that are not stable in a pH-alkaline liquid may also be used. With respect to the addition of these additives to a bulk paint, the amount of such additives may be limited by the amount that can be added into the paint while also providing for a workable viscosity.

The coatings of the present invention have various uses and are preferably flexible, erosion resistant, tough, hard, and dense coatings when applied to metal substrates, for example ferrous metal substrates, according to the methods of the present invention. Selection of the raw material components and amounts of each such components used to form the coatings of the present invention depend on the desired properties of the coating. For example, some components may provide better toughness and durability while others may provide better flexibility.

The coatings of the present invention may be corrosion resistant to molten aluminum by incorporating boron nitride, such as hexagonal-boron nitride (h-BN). Further, incorporating boron nitride into the coatings of the present invention may allow for nonwetting performance with molten aluminum and may also add lubricity at room temperature and high temperatures, such as 800° to 1000° Celsius. Because of its high flexibility and nonwetting/nonstick properties, the boron nitride coatings of the present invention may be applied to a multitude of products, including, but not limited to, thermocouple sheaths, injection lances, "thief-sample" cups and troughs, splash inserts, molds and pins for high-pressure or low-pressure diecasting, low-friction bearings and moving parts, extrusion components such as dies and dummy blocks, and frying pans.

Alternatively, the coatings of the present invention may be more thermally insulating by incorporating zirconia into the raw material components or the bulk paint system of the present invention. The coatings of the present invention may be capable of use at and below room temperature to well over 1000° Celsius. For example, certain uses may require use of the coatings of the present invention in an environment heated between 1000° to 1300° Celsius. Further, coatings applied to stainless steel based metal substrates may provide an electrically insulating layer when electrically conductive additives are not used. Additionally, certain coatings of the present invention, and particularly those without additives, have a black to brassy colored finish that may provide beneficial high-emissivity surface coatings.

Having generally described this instant disclosure, a further understanding can be obtained by reference to certain specific examples illustrated below which are provided for purposes of illustration only and are not intended to be all inclusive or limiting unless otherwise specified.

Testing & Examples

The preparation, identification, and testing of example raw materials, bulk paints, dry powders mixtures, and coatings of this disclosure are further described below. The particular materials and amounts thereof recited in these examples, as well as other conditions and details, should not be construed to unduly limit this invention. In these examples, all percentages, proportions and ratios are by weight unless otherwise indicated.

Generally, sample bulk paints and dry powder mixtures for application to a substrate to form the coatings of the present invention were prepared by initially combining raw materials components. The combined raw material components may be combined with or without further processing. For example, the combined raw material components may be processed by melting the components to thereby make a frit and then grinding into a dry powder mixture. Alternatively, the raw material components may be processed by combining and calcining the components to preferably provide homogeneity of the separate phases prior to grinding. In a further alternative, the raw material components may be processed by milling the components. The processed or unprocessed combined components may then be formed into a bulk paint coating, such as a water-based paint by combining the processed combined components with water and/or a suspension agent, or, alternatively, the processed or unprocessed combined components may remain as a uniform dry powder mixture.

The combined raw material components that were processed by making a frit and then ground produced a very uniform dry powder mixture and bulk paint. Further, incorporating a mixture of soluble phases lead to a very uniform powder and paint. Calcining the combined raw materials produced processed components that did not affect the pH of the water solution when a bulk paint was formed. Thus, calcining the combined raw materials components may be preferred when forming a bulk paint.

The bulk paint or dry powder mixture may then be applied to a metal based substrate. After applying the bulk paint or dry powder mixture onto the substrate, the coated substrate may be baked so that the bulk paint or dry powder mixture fuses onto the metal to form a ceramic coating of the present invention. The coatings of the present invention are preferably fully dense, tough, hard, erosion resistant, and flexible (can withstand multiple bends of 90 degrees back and forth with minimal or no visibly recognizable flaking, chipping, or delaminating). Further, despite the high $B_2O_3$ content of the coatings of the present invention, the ceramic coatings are preferably not water soluble after baking onto the metal substrates.

The thickness of the after fired coatings and certain properties of a particular coating of the present invention depend on the thickness of the dried bulk paint layer or dry powder mixture layer applied to the substrate surface, the application technique of same, the precursor raw materials used, and the after fired coating composition sought. In one embodiment, the coating may vary from about 0.0002 (0.2 mils) as a very thin coating to about 0.008 inches (8 mils). A thicker coating of approximately 5-10 mils often results when the bulk paint and/or dry powder mixture is applied by multiple bushing, dipping, or air-spraying applications onto a substrate surface.

In one experiment, the ceramic coating included an after firing composition of 17.0 weight percent $K_2O$, 35.6 weight percent $SiO_2$, and 47.3 weight percent $B_2O_3$, which translates to 12.4 mol. % $K_2O$, 40.9 mol. % $SiO_2$, and 46.7 mol. % $B_2O_3$ (an approximate formula of $2K_2O*7SiO_2*8B_2O_3$). Example available precursor raw materials used for yielding the above after firing coating composition include those shown in Table I below. Table I is not intended as an exhaustive list of raw materials that may be used to form the coatings of the present invention and alternative raw materials to those identified in Table I may be used for yielding the after firing coating compositions of the present invention.

TABLE I

| RAW MATERIAL | REFERENCE |
| --- | --- |
| Potassium Tetraborate powder ($K_2B_4O_7*4H_2O$) | KBO |
| Ammonium Pentaborate powder ($NH_4B_5O_8*4H_2O$) | APB |
| Potassium Hydroxide solution (45 wt. %) | KOH (45%) Solution |
| $SiO_2$ fine powder (flint) | $SiO_2$ Fine Powder |
| Colloidal Silica, $SiO_2$ Bindzil 830 with 30 wt. % $SiO_2$ | Bindzil 830 |
| Colloidal Silica, $SiO_2$ Bindzil 9950 with 50 wt. % $SiO_2$ | Bindzil 9950 |
| Boric Acid ($H_3BO_3$) −400 Mesh powder | Boric Acid |
| Potassium Silicate powder, Kasolv 16 | Kasolv 16 |
| Potassium Silicate solution, Kasil 6 or other composition of Potassium Silicate solution | Kasil 6 |
| Potassium Carbonate ($K_2CO_3$) | Potassium Carbonate |

Four example bulk paints using the raw material components of Table I, water, and cellulosic suspension agent are shown in Table II below. The percentages and combination of these raw material components were combined and fired to form a ceramic coating of the present invention having 17.0 weight percent $K_2O$, 35.6 weight percent $SiO_2$, and 47.3 weight percent $B_2O_3$. In alternative examples, a ceramic coating may be formed using the raw materials set forth in Table II below (combined to form a dry powder mixture) but without the addition of water and/or the suspension agent. The combined raw material components of the examples in Table II may be milled with alumina cylinders to uniformly mix the ingredients into a bulk paint. Alternatively, prior to forming the bulk paint, a frit may be formed using the combined raw material components by heating the combined raw material components to approximately 800-1200° Celsius until melted, followed by quenching, and then grinding to a powder. In yet a further alternative, the combined raw material components may be calcined at 600-700° Celsius and then ground into a powder prior to forming the bulk paint. The bulk paint may be formed by combining the processed or unprocessed combined raw material components with water and a cellulosic suspension agent as set forth in Table II below. $SiO_2$ Fine Powder was added in Examples 1 and 2 while only colloidal silica was added in Examples 3 and 4. The below examples incorporating $SiO_2$ Fine Powder were found to have better paint formulation consistency than the examples only incorporating colloidal silica.

TABLE II

|  | Amount (grams) |
|---|---|
| Example 1 Components |  |
| KBO Powder | 55.1 g. |
| APB Powder | 34.6 g. |
| $SiO_2$ Fine Powder | 23.5 g. |
| Bindzil 9950 | 24.1 g. |
| Water + 2% cellulosic suspension agent | 32-47 g. |
| Example 2 Components |  |
| KBO Powder | 55.1 g. |
| APB Powder | 34.6 g. |
| $SiO_2$ Fine Powder | 23.5 g. |
| Bindzil 830 | 40.2 g. |
| Water + 2% cellulosic suspension agent | 78 g. |
| Example 3 Components |  |
| KBO Powder | 55.1 g. |
| APB Powder | 34.6 g. |
| Bindzil 9950 | 71.2 g. |
| Water + 2% cellulosic suspension agent | 32 g. |
| Example 4 Components |  |
| KBO Powder | 55.1 g. |
| APB Powder | 34.6 g. |
| Bindzil 830 | 118.7 g. |
| Water + 2% cellulosic suspension agent | 20 g. |

After forming the bulk paints in Examples 1-4 of Table II above, the bulk paints were each was applied to 304 stainless steel coupons, such as by painting a thin layer onto the coupons. The 304 stainless steel coupon was 3"×6" and 0.035" (35 mils) thick. Both coupons that were non-oxidized and coupons that were pre-oxidized at 800-950° Celsius were used. Pre-oxidation of the coupons may be done at 800-850° Celsius for 30 minutes to one hour or longer and/or 900-950° Celsius for 30 minutes. Both the pre-oxidized and non-oxidized coupons with bulk paint applied were baked in an air atmosphere furnace at approximately 800° Celsius for a 30-minute soak time. After baking, the coated coupons were quenched by removing the coupons from the furnace and allowing the coupons to rapidly cool to room temperature. Each of the resulting coated coupons were tested and found to be bendable over a 90-degree edge with minimal to no flaking, delamination, cracking, or peeling of the coating and the resulting coating was hard, adherent, tough, and flexible and had a glassy appearance. The pre-oxidized 304 stainless steel coated coupon provided slightly better coating adherence and flexibility without edge cracking than the non-oxidized 304 stainless steel coated coupons, which had slight edge cracking when bent multiple times. Further, the samples incorporating Bindzil 9950, which has coarser colloidal particles than Bindzil 830, provided for a slightly more uniform coating.

Several experiments were performed using the combined raw material components of Example 3 above. In these experiments, the combined raw material components were mixed and calcined at 700° Celsius for four hours. The calcined mixture was then ground to a powder. Next, a bulk paint was formed by combining 15 grams of ground calcined powder with approximately 22.5 grams of water having about 2 weight percent cellulosic suspension agent. Additional water and cellulosic suspension agent may be added as needed to increase the flowability of the bulk paint. For example, a bulk paint may be formed by combining 41.5 grams of calcined powder with 62.25 grams of water having 2 weight percent suspension agent (providing a viscosity of approximately 1134 centipoise). After forming, the bulk paint was applied as a water-based paint to both stainless steel based and nickel based coupons including (1) un-oxidized and pre-oxidized coupons of 304 stainless steel (3×6 inches and 0.035 inches thick), (2) un-oxidized and pre-oxidized coupons of 316 stainless steel (3×6 inches and 0.024 inches thick), (3) un-oxidized and pre-oxidized coupons of 430 stainless steel (3×6 inches and 0.028 inches thick), (4) un-oxidized and pre-oxidized Inconel (IN) 718 disc divided into test bars (1×6 inch bars and 0.236 inches thick, cut from a plate of about 19.5 cm in diameter), and (5) un-oxidized and pre-oxidized coupons of Haynes (HA) 214 (approximately 1.5 inches×3 inches). Prior to application of the bulk paint, the pre-oxidized coupons were pre-oxidized by oxidizing them at 930-950° Celsius for approximately 30 minutes.

After the coupons were painted and allowed to dry, a first test group of coupons and a second test group of coupons were evaluated for forming a coating of the present invention. The first test group was inserted into an air furnace at 800° Celsius for thirty minutes. After thirty minutes, the coupons were air-quenched to room temperature. The ceramic coated coupons were then evaluated both visually and by bending each coupon. The results of the evaluation of the first test group are set forth below in Table III.

TABLE III

| Coupon | Not Pre-Oxidized | Pre-Oxidized |
|---|---|---|
| 304 SS | Visually smooth; chips some on bend | Visually smooth; less chips on bend |
| 316 SS | Visually good; bends without chips | Visually good coat; chips on bend |
| 430 SS | Visually smooth; chips on bend | Visually good coat and smooth; no chips on bend |
| Inconel (IN) 718 | Adherent; flakes material on bend | Adherent; crystallizes material on bend |
| Haynes (HA) 214 | Visually good; flakes/chips on bend | Visually good; few chips on bend |

In contrast to the first test group, the second test group was inserted into an air furnace at 950° Celsius for thirty minutes. After thirty minutes, the coupons were air-quenched to room temperature. Like the first test group, the coated coupons were then evaluated both visually and by bending each coupon. The results of the evaluation of the second group are set forth below in Table IV.

TABLE IV

| Coupon | Not Pre-Oxidized |
|---|---|
| 304 SS | Green colored; chips a lot on bending and flakes off at bend |
| 316 SS | Green colored; chips at bend but less than others |
| 430 SS | Green colored; chips off at bend |
| Inconel (IN) 718 | Green colored; chips off at bend |
| Haynes (HA) 214 | Green colored with some transparent regions; chips/flakes at bend |

As shown above with respect to the second test group, heating the coupons to 950° Celsius led to a detrimental effect on the flexibility and bending capabilities of the ceramic coatings on all of the coupons, which may have been the result of too much diffusion or leaching of the chromium from the coupons into the coatings. Minimal leaching or diffusion of chromium into the coating likely occurred with respect to the first test group, and such minimal amounts are believed to provide beneficial effects to the coating.

A bulk paint using the components of Example 3 set forth above was also applied and evaluated with non-stainless steel coupons of unoxidized SAE 1008/1010 steel (0.6% manganese; max 0.15% carbon; max 0.03% phosphorous; max 0.035% sulfur; balance iron) that were 0.032 inches thick ("SAE coupons"). After the bulk paint was applied to the SAE coupons, they were heated to 800° Celsius and held for thirty minutes followed by furnace cool-down to approximately 200° Celsius. Initially the SAE coupons were heated in an air atmosphere however the coupons essentially oxidized to dust despite having the coating. Thus, the SAE coupons were also tested in non-air atmospheres including an argon atmosphere and a nitrogen atmosphere. After the furnace cool-down to approximately 200° Celsius, the coupons were removed and evaluated. The SAE coupons heated in an argon atmosphere visually exhibited an adherent but not glassy coating and chipped on bending. The SAE coupon heated in a nitrogen atmosphere visually exhibited an adherent but not glassy coating that was easily removable by rubbing and chips on bending.

Additionally, a bulk paint using the components of Example 3 set forth above was applied and evaluated with plain carbon steel coupons. The carbon steel coupons overly oxidized when heated in an air atmosphere so examples were also heated in an argon atmosphere and a nitrogen atmosphere. A poor coating however was formed on the plain carbon steel coupons heating on the argon and nitrogen atmospheres.

In view of the various substrates tested, the chromium containing substrates provided the best coatings when applying a bulk paint incorporating the Example 3 components set forth above. Indeed, the metal oxide layer of the ferrous metals tested assisted with tightly bonding the bulk paint to the substrate. Thus, the bulk paints, dry powder mixtures, and coatings of the present invention are particularly suitable for applications involving ferrous metals.

Three example bulk paints that were water bath treated are shown below in Table V. A water bath treatment may include mixing the combined raw material components and then heating the mixture by inserting it in a heated and temperature-controlled water bath held at a uniform temperature of 60-80° Celsius. In the present examples, the water bath was held at approximately 80° Celsius. Incorporating a water bath treatment allowed the component raw materials to dissolve into a homogeneous liquid.

TABLE V

| | Amount (grams) |
|---|---|
| Example 5 Components | |
| Kasil 6 solution | 155.4 g. |
| APB Powder | 73.8 g. |
| Water + 2% cellulosic suspension agent | 225 g. |
| Example 6 Components | |
| KBO Powder | 55.1 g. |
| APB Powder | 34.6 g. |
| Bindzil 9950 | 71.2 g. |
| Water + 2% cellulosic suspension agent | 203 g. |
| Example 7 Components | |
| KBO Powder | 55.1 g. |
| APB Powder | 34.6 g. |
| Bindzil 830 | 118.7 g. |
| Water + 2% cellulosic suspension agent | 203 g. |

The above compositions of Examples 6 and 7 were more uniform than the above composition of Example 5. By heating and ball-milling the water bath treated mixture, the homogeneity of the liquid was insured when the liquid was cooled. The cooled liquid may then be used as a bulk paint of the present invention. Alternatively, the cooled liquid may be dried, calcined at approximately 600-700° Celsius, and ground into a powder. The powder may then be used to form a paint such as by combining 15 grams of ground and calcined powder with 22.5 grams of water having 2% cellulosic suspension agent.

In an alternative embodiment of the present invention, 32 grams of water, having 2 percent suspension agent, may be combined with the combined raw material components of Example 6 above. The liquid mixture may be mixed, dried, and then calcined at approximately 700° Celsius for four hours in an air atmosphere. A black foamy glass material resulted from this processed mixture, which was then milled. After milling, the resulting milled mixture may be applied to various metals.

As discussed herein, it may be desirable to incorporate boron nitride powder as a raw material into the bulk paint or dry powder mixture of the present invention. For example, boron nitride is typically nonwetting with molten aluminum and therefore provides excellent release of molten or solidified aluminum from surfaces coated with boron nitride containing coatings. Preferably, when boron nitride powder is incorporated, the after fired ceramic coating includes at least 20 weight percent boron nitride. For example, 20 weight percent boron nitride may be present in a $K_2O$—$SiO_2$—$B_2O_3$ based ceramic coating having a $K_2O$—$SiO_2$—$B_2O_3$ composition of 22.5 weight percent $K_2O$, 47.0 weight percent $SiO_2$, and 30.5 weight percent $B_2O_3$ (16.4 mol. % $K_2O$, 53.7 mol. % $SiO_2$, and 29.9 mol. % $B_2O_3$). Example components of a bulk paint incorporating boron nitride powder of the present invention are set forth in Examples 8 and 9 of Table VI below.

TABLE VI

| | Amount (grams) |
|---|---|
| Example 8 Components | |
| KBO Powder | 66.7 g. |
| KOH (45%) Solution | 6.6 g. |
| Bindzil 9950 | 94.0 g. |
| BN Powder | 20 g. |
| Water + 2% cellulosic suspension agent | Varies |
| Example 9 Components | |
| KBO Powder | 66.7 g. |
| Kasolv 16 | 7.7 g. |
| Bindzil 9950 | 86.0 g. |
| BN Powder | 20 g. |
| Water + 2% cellulosic suspension agent | Varies |

The non-boron nitride raw materials components of Examples 8 and 9, may be combined, mixed, dried, and calcined at approximately 700° Celsius for four hours in an air atmosphere. A white foamy glass material resulted when this was done. The material may then be ground into a powder and additive components, such as boron nitride powder, zirconium dioxide powder, and/or cerium oxide fillers may be added to the ground powder. A bulk paint of the present invention may then be formed by adding water and a suspension agent.

Bindzil 830 or $SiO_2$ Fine Powder may be substituted as a raw material instead of Bindzil 9950 as set forth in Examples 8 and 9 above. Alternatively, a combination of Bindzil 830 and $SiO_2$ Fine Powder may be substituted as a raw material instead of Bindzil 9950 as set forth in Examples 8 and 9 above.

Additives other than or in addition to boron nitride may be incorporated with the raw material components of the present invention without departing from the spirit and scope of the present invention. Such additives may be beneficial for modifying the properties of the final after-fired coating of the present invention. For example, the addition of zirconium dioxide based raw material components may be incorporated to increase the thermal insulation properties of the coating of the present invention. In one embodiment, zirconium dioxide as an unstabilized oxide may be incorporated as a raw material to increase thermal insulation properties of the coating. In an alternative embodiment, zirconium oxide stabilized with calcia, magnesia, and/or yttria may be incorporated as a raw material component to increase thermal insulation properties of the coating. In yet another embodiment, a yttrium oxide based raw material component may be incorporated to increase thermal insulation properties of the coating.

Figure 1:
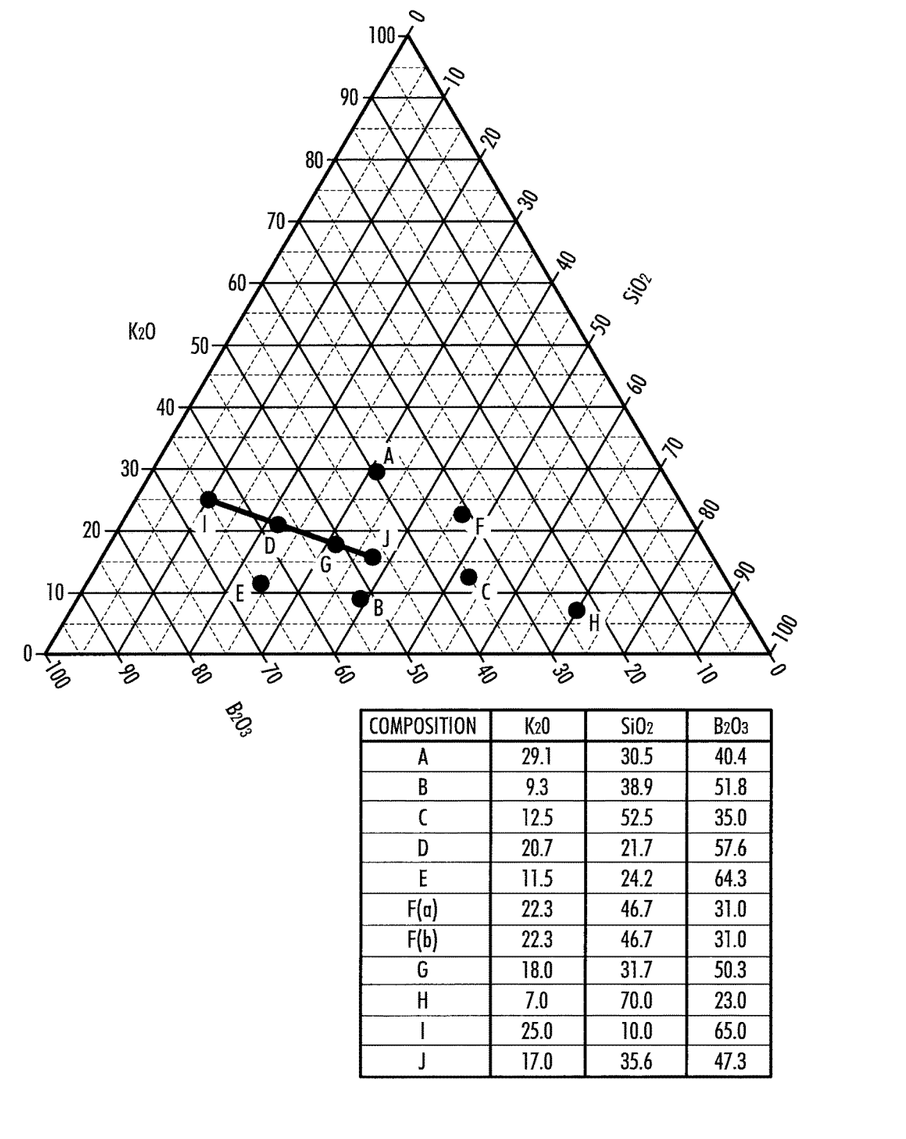
FIG. 1 is a ternary composition diagram showing the ranges in weight percent of an embodiment of the $R_2O$—$SiO_2$—$B_2O_3$ composition of the ceramic composition based coating system of the present invention.

FIG. 1 discloses example $K_2O$—$SiO_2$—$B_2O_3$ ternary composition based ceramic coatings of the present invention. The ranges set forth in FIG. 1 are based on the after fired coating weight percent ranges of $K_2O$—$SiO_2$—$B_2O_3$. Example precursor raw material components used to form the $K_2O$—$SiO_2$—$B_2O_3$ ternary composition based coatings of FIG. 1 are set forth in Examples 10 through 20 of Table VII below.

TABLE VII

| | Amount (grams) |
|---|---|
| Example 10 Components (Comp. A) | |
| Ternary Range - Comp. A (29.1% $K_2O$, 30.5% $SiO_2$, 40.4% $B_2O_3$) | |
| KBO Powder | 55.1 g. |
| APB Powder | 34.6 g. |
| $SiO_2$ Fine Powder | 23.55 g. |
| Bindzil 9950 | 24.1 g. |
| KOH (45%) Solution | 45.0 g. |
| Water + 2% cellulosic suspension agent | as needed |
| Example 11 Components (Comp. B) | |
| Ternary Range - Comp. B (9.3% $K_2O$, 38.9% $SiO_2$, 51.8% $B_2O_3$) | |
| KBO Powder | 27.63 g. |
| APB Powder | 54.3 g. |
| $SiO_2$ Fine Powder | 23.55 g. |
| Bindzil 9950 | 24.1 g. |
| Water + 2% cellulosic suspension agent | as needed |
| Example 12 Components (Comp. C) | |
| Ternary Range - Comp. C (12.5% $K_2O$, 52.5% $SiO_2$, 35.0% $B_2O_3$) | |
| KBO Powder | 55.1 g. |
| APB Powder | 34.6 g. |
| $SiO_2$ Fine Powder | 23.55 g. |
| Bindzil 9950 | 95.3 g. |
| Water + 2% cellulosic suspension agent | as needed |
| Example 13 Components (Comp. D) | |
| Ternary Range - Comp. D (20.7% $K_2O$, 21.7% $SiO_2$, 57.6% $B_2O_3$) | |
| KBO Powder | 55.1 g. |
| APB Powder | 34.6 g. |
| $SiO_2$ Fine Powder | 8.9 g. |
| Bindzil 9950 | 17.8 g. |
| Water + 2% cellulosic suspension agent | as needed |
| Example 14 Components (Comp. E) | |
| Ternary Range - Comp. (E) (11.5% $K_2O$, 24.2% $SiO_2$, 64.3% $B_2O_3$) | |
| KBO Powder | 55.1 g. |
| APB Powder | 108.4 g. |
| $SiO_2$ Fine Powder | 23.55 g. |
| Bindzil 9950 | 24.1 g. |
| Water + 2% cellulosic suspension agent | as needed |
| Example 15 Components (Comp. F(a)) | |
| Ternary Range - Comp. F(a) (22.3% $K_2O$, 46.7% $SiO_2$, 31.0% $B_2O_3$) | |
| KBO Powder | 51.7 g. |
| KOH (45%) Solution | 2.9 g. |
| $SiO_2$ Fine Powder | 23.55 g. |
| Bindzil 9950 | 24.1 g. |
| Water + 2% cellulosic suspension agent | as needed |
| Example 16 Components (Comp. F(b)) | |
| Ternary Range - Comp. F(b) (22.3% $K_2O$, 46.7% $SiO_2$, 31.0% $B_2O_3$) | |
| KBO Powder | 51.7 g. |
| Kasolv 16 | 3.4 g. |
| $SiO_2$ Fine Powder | 16.9 g. |
| Bindzil 9950 | 33.8 g. |
| Water + 2% cellulosic suspension agent | as needed |
| Example 17 Components (Comp. G) | |
| Ternary Range - Comp. G (18.0% $K_2O$, 31.7% $SiO_2$, 50.3% $B_2O_3$) | |
| KBO Powder | 55.1 g. |
| APB Powder | 34.6 g. |
| $SiO_2$ Fine Powder | 17.8 g. |
| Bindzil 9950 | 24.1 g. |
| Water + 2% cellulosic suspension agent | as needed |
| Example 18 Components (Comp. H) | |
| Ternary Range - Comp. H (7.0% $K_2O$, 70.0% $SiO_2$, 23.0% $B_2O_3$) | |
| KBO Powder | 55.1 g. |
| APB Powder | 48.2 g. |
| $SiO_2$ Fine Powder | 121.1 g. |
| Bindzil 9950 | 100.0 g. |
| Water + 2% cellulosic suspension agent | as needed |
| Example 19 Components (Comp. I) | |
| Ternary Range - Comp. I (25.0% $K_2O$, 10.0% $SiO_2$, 65.0% $B_2O_3$) | |
| KBO Powder | 68.0 g. |
| APB Powder | 37.0 g. |
| $SiO_2$ Fine Powder | 4.2 g. |
| Bindzil 9950 | 8.4 g. |
| Water + 2% cellulosic suspension agent | as needed |
| Example 20 Components (Comp. J) | |

TABLE VII-continued

| | Amount (grams) |
|---|---|
| Ternary Range - Comp. J (17.0% $K_2O$, 35.6% $SiO_2$, 47.3% $B_2O_3$) | |
| KBO Powder | 55.1 g. |
| APB Powder | 34.6 g. |
| Bindzil 9950 | 71.2 g. |
| Water + 2% cellulosic suspension agent | as needed |

Each of the coatings of Examples 10 through 20 were prepared by (1) combining and mixing the precursor raw material components, (2) calcining the combined components at 700° Celsius for four hours in air, (3) milling the calcined mixture, (4) forming a bulk paint by combining the milled mixture with water and a cellulosic suspension agent, (5) painting the bulk paint as uniformly as possible on 304 stainless steel coupons, (6) drying the painted coupons, (7) baking the dried painted coupons for thirty minutes at 800° Celsius, and (8) air quenching the baked coupons. In an alternative method of the present invention, a dry powder mixture incorporating the combined raw material components may be applied to the coupons without forming a bulk paint.

To form a brushable bulk paint of the present invention, the loading ratio of powder to water/organic binder of the bulk paint may be approximately 40-45 weight percent powder and may have a viscosity of approximately 1000 to 1200 centipoise. More preferably the viscosity is approximately 1100 to 1150 centipoise or even more preferably the viscosity is approximately 1130 to 1140 centipoise. In one embodiment, the viscosity of the bulk paint is approximately 1134 centipoise. For example, 41.5 grams of powder may be combined with 62.2 grams of water having approximately 2 weight percent organic binder, such as cellulosic suspension.

Prior to being painted, the 304 stainless steel coupons are preferably cleaned with alcohol or pre-oxidized, such as by heating the coupons for 30 minutes at 900° Celsius and then air quenching until cool. After the coupons having the precursor raw material components of Examples 10 through 20 of Table VII applied and baked thereon are cooled, each coated coupon was evaluated based on visual characteristics and bendability. The bendability was evaluated by bending the coupons at the half-way point approximately 90 degrees. The coatings formed using the raw material components of Examples 10 through 20 and having the $K_2O$—$SiO_2$—$B_2O_3$ ternary compositions of compositions A through J all yielded desirable properties as shown in Table VIII below.

TABLE VIII

| Comp. | 304 SS | Visual Observation | Bending Observation |
|---|---|---|---|
| A | Pre-Oxidized | Splotchy, brown-black color | Bendable |
| A | Not-Oxidized | Splotchy, brown-black color | Bendable |
| B | Pre-Oxidized | Good coating; some phase separation | Bendable |
| B | Not-Oxidized | Good coating with no "orange-peel" look | Very bendable |
| C | Pre-Oxidized | Rough but uniform | Bendable |
| C | Not-Oxidized | Black glassy, very slight "orange-peel" look | Bendable |
| D | Pre-Oxidized | Most uniform | Very bendable |
| D | Not-Oxidized | Uniform | Bendable |
| E | Pre-Oxidized | Not uniform; rough but good | Bendable |
| E | Not-Oxidized | Somewhat splotchy, not very glassy, moderately good | Bendable |
| F(a) | Pre-Oxidized | Not glassy, rough | Primarily bendable |
| F(a) | Not-Oxidized | Phase separation | Not very bendable |
| F(b) | Pre-Oxidized | Not glassy, rough, but ok | Primarily bendable |
| F(b) | Not-Oxidized | Splotchy, brown-black color, islands of separation | Not very bendable |
| G | Pre-Oxidized | Primarily uniform with some "orange-peel" | Bendable |
| G | Not-Oxidized | Primarily uniform, gray color | Bendable |
| H | Pre-Oxidized | Rough, not glassy | Moderately Bendable |
| H | Not-Oxidized | Rough, not glassy | Moderately Bendable (better than pre-oxidized) |
| I | Pre-Oxidized | Glassy with islands of separation | Moderately Bendable |
| I | Not-Oxidized | Glassy (better than pre-oxidized) | Moderately Bendable |
| J | Pre-Oxidized | Good coating | Bendable |
| J | Not-Oxidized | Uniform but less than pre-oxidized coating | Bendable |

The coatings having $K_2O$—$SiO_2$—$B_2O_3$ ternary compositions D, G, and J produced the most desirable visual and bendable properties. These compositions were next soaked in water. Composition J was stable in water for an extended period of time while Compositions G and D exhibited moderate effects of water after soaking for approximately a day.

$Na_2O$—$SiO_2$—$B_2O_3$ and $Li_2O$—$SiO_2$—$B_2O_3$ ternary composition based coatings according to the present invention having molar equivalents to compositions A through J set forth in Examples 10 through 20 of Table VII above are shown by weight percent of component in Table IX below.

TABLE IX

| Comp. | $Na_2O$ | $Li_2O$ | $SiO_2$ | $B2O_3$ |
|---|---|---|---|---|
| A' | 21.2 | — | 33.8 | 45.0 |
| B' | 6.3 | — | 40.0 | 53.7 |
| C' | 8.6 | — | 54.4 | 37.0 |
| D' | 14.6 | — | 23.2 | 62.1 |
| E' | 7.8 | — | 25.1 | 67.1 |

TABLE IX-continued

| Comp. | Na₂O | Li₂O | SiO₂ | B2O3 |
|---|---|---|---|---|
| F' | 15.8 | — | 50.5 | 33.7 |
| G' | 12.6 | — | 33.6 | 53.7 |
| H' | 4.7 | — | 71.7 | 23.6 |
| I' | 17.9 | — | 10.9 | 71.2 |
| J' | 11.8 | — | 37.7 | 50.5 |
| A" | — | 11.5 | 37.9 | 50.6 |
| B" | — | 3.1 | 41.4 | 55.5 |
| C" | — | 4.3 | 57.0 | 38.7 |
| D" | — | 7.7 | 25.1 | 67.2 |
| E" | — | 3.9 | 26.1 | 69.9 |
| F" | — | 8.3 | 55.0 | 36.7 |
| G" | — | 6.5 | 36.0 | 57.5 |
| H" | — | 2.3 | 73.5 | 24.2 |
| I" | — | 9.5 | 12.0 | 78.5 |
| J" | — | 6.1 | 40.2 | 53.7 |

Alterative precursor raw material components forming a ceramic coating having the same $K_2O$—$SiO_2$—$B_2O_3$ ternary range as Composition J above (ternary Range 17.0% $K_2O$, 35.6% $SiO_2$, 47.3% $B_2O_3$) are set forth in Examples 21-24 of Table X below. In these Examples, the precursor raw material components are combined and then may be processed. For example, a frit may be formed using the combined raw material components by mixing the components, melting the mixed components until they are homogenized, and then grinding into a powder. Alternatively, the combined raw material components may be calcined as set forth herein. A bulk paint may be formed by combining the processed or unprocessed combined raw material components with a cellulosic suspension agent mixed with water, wherein the cellulosic suspension agent and water preferably burn out during firing. The bulk paint may be painted on a surface, such as a metallic surface set forth herein, and heated to a fusion temperature of 800-975° Celsius. Alternatively, a processed or unprocessed dry powder mixture may be applied directly to a surface, such as a metallic surface set forth herein, and heated to a fusion temperature of 800-975° Celsius.

TABLE X

| | Amount (grams) |
|---|---|
| Example 21 Components | |
| Ternary Range - Comp. J (17.0% $K_2O$, 35.6% $SiO_2$, 47.3% $B_2O_3$) | |
| KBO Powder | 43.97 g. |
| APB Powder | 27.6 g. |
| SiO₂ Fine Powder | 28.4 g. |
| Water + 2% cellulosic suspension agent | as needed |
| Example 22 Components | |
| Ternary Range - Comp. J (17.0% $K_2O$, 35.6% $SiO_2$, 47.3% $B_2O_3$) | |
| Kasolv 16 | 39.13 g. |
| APB Powder | 55.0 g. |
| SiO₂ Fine Powder | 5.87 g. |
| Water + 2% cellulosic suspension agent | as needed |
| Example 23 Components | |
| Ternary Range - Comp. J (17.0% $K_2O$, 35.6% $SiO_2$, 47.3% $B_2O_3$) | |
| Kasolv 16 | 36.4 g. |
| Boric Acid | 58.1 g. |
| SiO₂ Fine Powder | 5.5 g. |
| Water + 2% cellulosic suspension agent | as needed |
| Example 24 Components | |
| Ternary Range - Comp. J (17.0% $K_2O$, 35.6% $SiO_2$, 47.3% $B_2O_3$) | |
| Potassium Carbonate | 17.3 g. |
| Boric Acid | 58.1 g. |
| SiO₂ Fine Powder | 24.7 g. |
| Water + 2% cellulosic suspension agent | as needed |

Examples 23 and 24 were each formed by thoroughly mixing the respective precursor raw material components, heating the mixtures up to 1000° Celsius to form a frit, water-quenching the frit, and then grinding the water-quenched frit to a uniform fine powder by ball milling. A bulk paint was then formed from the ball milled powders using a solvent base, such as ethanol. The bulk paint was painted onto both pre-oxidized and unoxidized 304 SS coupons (pre-oxidized coupons were oxidized at 800° Celsius for 1 hour). The painted coupons were then heated to 850° Celsius for 1 hour, which lead to a uniform and durable coating on the coupon.

In further examples of the present invention, bulk paint systems and dry powder mixture systems were tested using potassium silicate plus boron nitride slurries as the precursor raw material component. For example, a boron nitride slurry having approximately 48-56 weight percent potassium silicate solution, 12-14 weight percent boron nitride powder, and 30-40 weight percent water having 2 percent cellulosic suspender may be used ("BN Slurry"). In one embodiment, the potassium silicate solution may contain 39.2 weight percent solids having a composition of 32.3 weight percent $K_2O$ and 67.7 weight percent $SiO_2$. In this embodiment, oxidation of the boron nitride forms a coating having the $K_2O$—$B_2O_3$—$SiO_2$ ternary system of Composition J set forth in FIG. 1 (17.0% $K_2O$, 35.6% $SiO_2$, 47.3% $B_2O_3$).

In a first test incorporating the BN Slurry as the precursor raw material component, the BN Slurry was applied to 304 stainless steel coupons and then heated for up to four days at 800° Celsius to fully oxidize the boron nitride powder to $B_2O_3$. In a second test incorporating the BN Slurry as the precursor raw material component, the BN Slurry was applied to 304 stainless steel coupons and then heated for up to a day and a half at 900° Celsius to fully oxidize the boron nitride powder to $B_2O_3$. As shown in Table XI below, the coupons of the first and second tests incorporating the BN Slurry were evaluated several times to determine when full oxidation occurred.

TABLE XI

Boron Nitride Test One (800° Celsius bake)

| Time at 800° C. | Observation of 304 SS Coupon |
|---|---|
| 10 hours | Some boron nitride present which is estimated at about 20% BN left or 50% of the amount at the onset of the soak after this time at temperature; coupon is not glassy but somewhat matt/rough and grayish-brown and streaky in appearance; molten aluminum does not 'wet' this surface, which is desirable; coupon exhibited good behavior on bending at 90 degrees with no observable cracks with the naked eye or using our Carson MicroBrite Plus 60-120x Power LED Lighted Pocket Microscope (MM-300). |

TABLE XI-continued

| | |
|---|---|
| 24 hours | Streaks of glassy material with BN still left and with a blacker-gray streaked look; estimated that approximately 70% of the BN that was initially included has been oxidized to Boron Oxide; good bending behavior with no chipping on bending at 90 degree bend. |
| 34.5 hours | More glassy material but still a minute amount of visible BN left that is estimated at 90-95% of the BN that was initially included; remainder has been oxidized and incorporated into the glassy portion; visually the coupon is blacker coupon with some streaks; good bending behavior on 90 degree bend with a few linear microcracks being observed with the Carson microscope. |
| 4 days | Uniform, black, glassy coating; coupon was tough, very erosion-resistant, and bendable; no observable flaking of coating at 90 degree bend. |

| Boron Nitride Test Two (900° Celsius bake) | |
|---|---|
| Time at 900° C. | Observation of 304 SS Coupon |
| 1 hour | About the same visual condition as at 800° C, 10-hour 304 SS coupon with slightly more BN oxidized; estimated 50-60% of the initial BN has oxidized to Boron Oxide and dissolved into the glassy portion; coupon was bendable with no observable cracks with the naked eye or using our Carson microscope at 60-120x. |
| 2.5 hours | Visually mostly black and glassy but partially streaky; estimated 85% of the initial BN has oxidized to Boron Oxide and dissolved into the glassy portion; bendable. |
| 5 hours | Visually almost all black and glassy; estimated <5% of the initial BN remains; bendable; Carson microscope observation shows some linear microcracks at the bent area. |
| 10 hours | Visually all black and glassy; bendable. |
| 24 hours | Visually all black and glassy on the front side of the coupon so coating protected the frontside; backside of the coupon shows the oxidation effects of holding at 900° Celsius for this long of a time; bendable; Carson microscope observation shows some linear microcracks at the bent area. |
| 35 hours | Visually the surface is still black and glassy but not as glossy and thinner; backside of the coupon shows the oxidation effects of holding at 900 Celsius for this long of a time; exhibits some flaking due to the effects of oxidation on its backside; bendable; no microcracks observable at the bent area with the Carson microscope so more bendable than at previous observations. |

The thickness of the after fired coatings of Table XI were approximately 0.0005 to 0.002 inches.

After approximately one day of the oxidation process of the first test, the boron nitride was only partially oxidized and a coating that was nonwetting to molten aluminum was formed. Moreover, at approximately 20% residual boron nitride remaining, an adherent coating was formed and such coating was nonwetting to molten aluminum. Thus, maintaining a certain level of boron nitride instead of entirely oxidizing the boron nitride in the coating, may have beneficial uses.

A third test incorporating the BN Slurry as the precursor raw material component was performed on a series of metals to determine the usability of the BN Slurry and coatings of the present invention with various metals. The metals were each coated with a single layer of BN Slurry and then heated in an air atmosphere to 925° Celsius for a three-hour soak time. The results of the third test are set forth in Table XII below.

TABLE XII

| Boron Nitride Test Three | |
|---|---|
| Substrate Material | Observation after 3 hour air soak at 925° C. |
| 304 Stainless Steel | Visually mostly glassy black coating with small amounts of gray streaks from residual unoxidized boron nitride; good coating |
| 4130 Steel Sheet (32 mils thick; 0.28-0.33 C; 0.8-1.1 Cr; 0 Ni) | Coating was adherent and visually matt gray (not glossy); oxidation-wise protective of the metal |
| H13 "tool" steel (>0.5 inches thick; 0.32-0.4 C; 5.13-5.25 Cr; 0 Ni) | Coating was adherent and visually matt gray (not glossy); oxidation-wise protective of the metal |
| Ni Hard Cast Iron (>0.5 inches thick; 3-3.6 C; 3 Cr; 4 Ni) | Coating was adherent and visually matt gray (not glossy); oxidation-wise protective of the metal |
| White Cast Iron, HC 15 (>0.5 inches thick; 3.1 C; 15 Cr; 0.8 Ni) | Coating was adherent and visually matt gray (not glossy); oxidation-wise protective of the metal |
| White Cast Iron, HC 28 (>0.5 inches thick; 2.9 C; 28 Cr; 1.2 Ni) | Coating was adherent and visually glossy black; oxidation-wise protective of the metal |
| Aluminized Steel (37.5 mils thick; | Coating peeled; no adherence to the substrate |

TABLE XII-continued

Boron Nitride Test Three

| Substrate Material | Observation after 3 hour air soak at 925° C. |
|---|---|
| Non-stainless steel with diffused aluminum coating for oxidation protection) | and provided no protection from oxidation. |
| Galvanized Steel (31 mils thick; Non-stainless steel with diffused zinc coating to prevent rusting) | Visually flaky coating |
| Chrome-plated Steel (94 mills thick; Coated by electro-plating chrome onto non-stainless steel for shiny visual effect) | Some coating adherence; chromium appears to have diffused into the steel; visually a green, durable, glassy, coating with a few splotchy regions on the mid-section; bendable |

Based upon the third test above, tested metals having a chromium content as low as 0.8-1.1% Chromium, such as 4130 steel, led to an adherent and matt coating layer. As the amount of chromium increased, the coating remained adherent and matt until the chromium content reached approximately 28%. At approximately 28% chromium, the coating was adherent but became glossy black.

A fourth test incorporating the BN Slurry as the precursor raw material component was performed on 310 stainless steel metal coupons. The BN Slurry was painted on a first and a second coupon, dried, and then heated to 900° Celsius. The first coupon was heated for one hour at 900° Celsius, which resulted in a coating that was light gray in appearance. Molten aluminum was poured over the first coupon, which was entirely non-wetting so that the molten aluminum did not adhere to the coupon. The second coupon was heated for three hours at 900° Celsius, which resulted in a coating that was mostly black in appearance. Molten aluminum was poured over the second coupon, which resulted in adherence of the aluminum to the coupon.

A fifth test incorporating the BN Slurry as the precursor raw material component was performed on 439 stainless steel parts (ASTM A240: 17-19% Cr; max 0.50 Ni; max 0.030 N). The parts were coated with the BN Slurry, heated to 900° Celsius and held for 3 hours in an air atmosphere, and then air-quenched. The resulting coating was adherent and durable.

A sixth test incorporating the BN Slurry as the precursor raw material component was performed wherein the BN Slurry was placed in a drier at 60° Celsius until the moisture was removed from the BN Slurry. A dried boron nitride powder cake was thereby formed. The dried boron nitride cake was ground into a fine powder and then sieved to remove coarse powder particles of greater than approximately 0.8 mm in diameter. The sieved fine powder was calcined by heating such powder to 700° Celsius for 4-5 hours and then furnace cooled. The calcined powder was then re-sieved. The calcined powder was then evenly and thinly spread (at approximately 0.004-0.008 inches or 0.1-0.2 mm) on a 304 SS coupon and heated to 925° Celsius for 3 hours followed by furnace cooling. A non-glassy, rough/stippled, and adherent coating resulted on the 304 SS coupon. The coated coupon was then reheated to 975° Celsius for 3 hours followed by air-quenching to room temperature. A glassy, black, and still adherent coating resulted on the 304 SS coupon. The coating was bendable (allowed for 90° bend with little to no flaking or deterioration) and durable. An additional test was also performed as set forth above, except that the sieved fine powder was not calcined and instead applied directly to a 304 SS coupon. A similar coating resulted upon heating to 925° Celsius except that the coating was more rough and stippled than the coating that resulted from use of the calcined powder. A practically identical coating resulted upon heating to 975° Celsius; however, minor flaking occurred upon bending at the bend regions of the coupon.

Additional experiments were performed by incorporating additives to the BN Slurry. In these experiments, 304 SS coupons were used and the painted coupons were heated to 925° Celsius for a three-hour soak time in an air atmosphere. In a first experiment, boron nitride powder was incorporated so that the composition included 80 parts by weight BN Slurry and 20 parts by weight boron nitride powder, which were combined and made into a uniform paint by adding water and approximately 0.1-5 weight percent cellulosic suspender. In a second experiment, zirconia powder was incorporated so that the composition included 80 parts by weight BN Slurry and 50 parts by weight zirconia powder. The zirconia powder was stabilized with 4 weight percent calcium oxide (calcia) with the remainder being zirconium dioxide. In a third experiment, cerium oxide (ceria) powder was incorporated so that the composition included 80 parts by weight BN Slurry and 64 parts by weight 99+% ceria powder, which were combined and made into a uniform paint by adding water and approximately 0.1-5 weight percent cellulosic suspender. In a fourth experiment, yttrium oxide (yttria) powder was incorporated so that the composition included 80 parts by weight BN Slurry and 44 parts by weight yttria powder, which were combined and made into a uniform paint by adding water and approximately 0.1-5 weight percent cellulosic suspender. In a fifth experiment, silicon nitride powder was incorporated so that the composition included 80 parts by weight BN Slurry and 30.6 parts by weight silicon nitride powder, which were combined and made into a uniform paint by adding water and approximately 0.1-5 weight percent cellulosic suspender. In a sixth experiment, magnesium aluminate spinel powder was incorporated so that the composition included 80 parts by weight BN Slurry and 32 parts by weight magnesium aluminate spinel powder, which were combined and made into a uniform paint by adding water and approximately 0.1-5 weight percent cellulosic suspender. In a seventh experiment, aluminum oxide powder was incorporated so that the composition included 80 parts by weight BN Slurry and 36 parts by weight aluminum oxide powder, which were combined and made into a uniform paint by adding water and approximately 0.1-5 weight percent cellulosic suspender. And in an eighth experiment, aluminum oxide powder was incorporated so that the composition included 80 parts by weight BN Slurry and 2.4 parts by weight aluminum oxide powder (approximately 3 weight percent aluminum oxide powder), which were combined and made into a uniform paint by adding water and approximately 0.1-5 weight percent cellulosic suspender. The component amounts incorporated in the first through seventh experiments were determined by using the ratio of the theoretical density of the materials.

Experiments one through four above, all resulted in coupons having a durable coating that was bendable without cracking or peeling. Additionally, parallel microcracks were not visible on any of the coupons with a magnifier. The coupons of the first, second, and fourth experiments were scratch resistant such that the coatings were not removable by applying mild abrasive force. Coupons from the first and second experiments were the most scratch resistant. The coupons of the third experiment were primarily scratch resistant however small amounts of the coating were removed when mild abrasive force was applied.

Experiments five through eight above, all resulted in coupons having a durable coating that was bendable without cracking or peeling. The coating of experiment five was gray and slightly streaked, the coating of experiment six was gray, the coating of experiment seven was white, and the coating of experiment eight was black. The coatings of experiments five through eight were scratch resistant such that the coatings were not removable by applying mild abrasive force. The coatings of experiments five, six, and eight were bendable with no cracking or peeling at the bend. Minor flaking and softness occurred at the bend on the coating of experiment seven.

A ninth experiment was also performed incorporating aluminum titanate tino the BN Slurry. In this experiment, the composition included 80 grams of BN Slurry and 31.4 grams of aluminum titanate, which were combined and made into a uniform paint by adding water and approximately 0.1-5 weight percent cellulosic suspender. The paint was brushed on 304 SS coupons, dried, and heated to 900° Celsius for a one-hour soak time in an air atmosphere. The resulting coating was adherent, durable, and bendable without flaking.

A tenth experiment was performed incorporating −325 mesh powder of nickel aluminide (NiAl) with the BN Slurry. In this experiment, the composition included 80 parts BN Slurry and 66.7 parts nickel aluminide powder. The paint was brushed on 304 SS coupons, dried at 60° Celsius in a dryer, heated to 900° Celsius in an air atmosphere and held at 900° Celsius for three hours. The resulting coating was adherent to the coupon, uniform, non-glossy and matt in appearance, non-electrically conducting, and bendable without noticeable flaking or cracks.

An eleventh experiment was performed incorporating a first titanium aluminide powder, denoted TiAl, with the BN Slurry. In this experiment, the composition included 20 grams of BN Slurry and 8.89 grams of TiAl powder. The paint was brushed on 304 SS coupons, dried at room temperature, heated to 900° Celsius in an air atmosphere, and held at 900° Celsius for three hours. The resulting coating was adherent to the coupon, uniform, non-glossy and matt in appearance, non-electrically conducting, and bendable without cracks or debonding.

A twelfth experiment was performed incorporating a second titanium aluminide powder, denoted $TiAl_3$, with the BN Slurry. In this experiment, the composition included 20 grams of BN Slurry and 7.56 grams of $TiAl_3$ powder. The paint was brushed on 304 SS coupons, dried at room temperature, heated to 900° Celsius in an air atmosphere, and held at 900° Celsius for three hours. The resulting coating was adherent to the coupon, uniform, non-glossy and matt in appearance, non-electrically conducting, and bendable without cracks or debonding.

A thirteenth experiment was performed incorporating 2 weight percent aluminum oxide with the BN Slurry. In this experiment, the composition included 50 grams of BN Slurry and 1 gram of aluminum oxide powder that was specifically A 1000 SG having a particle size below 1 micron. The aluminum oxide and BN Slurry were ball-milled together for approximately an hour. The resulting paint was then brushed on a 310 stainless steel coupon, dried, heated in a furnace to 1075° Celsius, held at 1075° Celsius for 1 hour, and then cooled in the furnace. The resulting coating was adherent to the coupon, uniform, glossy in appearance, and bendable without cracks, flakes, or debonding.

The BN Slurry set forth herein has a pH of approximately 9-10. Practically any additives may be incorporated with the BN Slurry set forth herein as long as the additives are compatible with the BN Slurry alkaline/basic pH. If incorporation of a particular additive is sought that is not compatible with the alkaline pH of the BN Slurry, a bulk paint or dry powder mixture may be formed using precursor raw materials components that may be processed into a frit or calcined prior to addition of such additives. For example, titanium diboride ($TiB_2$) is a preferred additive because it is both electrically and thermally conductive and stable with molten aluminum. Titanium diboride however does not heat well at a range of 800-1000° Celsius and is significantly more compatible with pH neutral or near pH neutral liquids. Thus, titantium diboride may not be compatible with the BN Slurry set forth herein but would be compatible with raw material components that are processed by forming a frit or calcined prior to incorporation of the titanium diboride.

In other embodiments to those set forth above, sodium silicate may be incorporated in addition to or as an alternative to potassium silicate to form a boron nitride slurry of the present invention. Sodium silicate may be incorporated as a sodium silicate solution, polybor (disodium octaborate tetrahydrate), or sodium silicate powder. Alternatively, lithium silicate may be incorporated in addition to or as an alternative to potassium silicate to form a boron nitride slurry of the present invention. Lithium silicate may be incorporated as lithium hydroxide monohydrate powder or lithium polysilicate solutions. In yet a further, alternative embodiment, a combination of potassium silicate, sodium silicate, and/or lithium silicate may be incorporated. Further, potassium, sodium, and lithium as binary or ternary mixtures may be incorporated as precursor raw materials without departing from the scope of the present invention.

As discussed above, the coatings of the present invention may be applied as a water-based paint or as a dry powder mixture to metals such as 304, 310, 316, 430, and 439 stainless steel, Haynes 214 corrosion oxidation resistant alloy, and Inconel 718. Additional metals and ferrous alloys are contemplated without departing from the spirit and scope of the present invention. Further, the ferrous alloy coating surface may be un-oxidized or pre-oxidized.

The combined precursor raw material components of the present invention may be painted or applied as a dry powder mixture to a metal surface, such as a ferrous metal substrate, and then heated to at least approximately 800 degrees Celsius. At this temperature, the combined precursor raw materials preferably bond down and fuse to the metal substrate. If the ferrous metal is oxidized before coating, pre-treatment temperatures of approximately 800 to 1000 degrees Celsius may be used to create an oxidized "bond layer" on the ferrous metal. Pre-treatment to create an oxidized bond layer preferably improves the adherence and behavior of the coating. For example, pre-oxidized ferrous metals often have a tighter-bonded coating with increased flexibility relative to ferrous metals that were not pre-oxidized.

Increasing the adherence properties of the surface of the metal substrate is often preferred. Using metal surfaces that are roughened or porous may increase adherence properties of the coatings of the present invention. Alternatively, incorporating an in-situ created layer, such as through oxidation of the ferrous metal surface as discussed above, may improve adherence properties and performance of the coatings of the present invention. As a further alternative, a ceramic sub-coating may be applied to the metal surface, such as by chemical vapor deposition (CVD), physical vapor deposition (PVD), plasma or flame spraying, to increase bonding of the coating of the present invention with the metal surface.

In an embodiment where the coating of the present invention is applied to a non-stainless ferrous metal, the coating may be applied and then heated in an argon atmosphere or other inert gas or nitrogen atmosphere. To increase adherence to a non-stainless ferrous metal, a thin oxide layer may be produced on the non-stainless ferrous metals prior to coating by heating to a few hundred degrees Centigrade until the surface is just barely visually brown-colored. This oxidized "bond layer" preferably improves adherence, even with the highly oxidizable non-stainless ferrous metals that typically cannot be heated to 800° Celsius in an air atmosphere without severe oxidation.

INDUSTRIAL APPLICABILITY

The coatings of the present invention may be used for many applications. Determination of the particular precursor raw material component composition as well as the after fired coating composition typically depends on the particular use of the coating and metal substrate upon which the coating is adhered. It will be understood by those of ordinary skill in the art that various raw material components, materials, and additives may be incorporated into the compositions that form the coatings of the present invention without departing from the scope of the present invention.

As discussed above, the coatings of the present invention may have various uses in multiple industries. For example, the coatings may be used in connection with high pressure and/or high temperature nonferrous metal diecasting by applying the coatings to molds, pins, ejectors and/or other diecasting parts. The coatings of the present invention may be used in connection with low pressure diecasting or gravity casting, such as wheelcasting molds. Coatings of the present invention that incorporate boron nitride are particularly useful for the above diecastings by providing nonwetting coatings for easy release of traditionally difficult part removal regions. Also for diecasting, a graded layer may be desired with the first coating onto the metal die being thermally insulating grading to a nonwetting coating topcoat. This may be achieved by the first coating being loaded with zirconia and the topcoating being loaded with boron nitride. Further, the coatings of the present invention may be used in connection with primary aluminum processing to provide release and durability to processing part. For example, the bulk paint or dry powder mixture of the present invention may be applied to and a coating formed on aluminum processing metal troughs, molds, immersion tubes, metal thermocouple protection tubes or sheaths, hand ladles, auto-pour ladles, injection lances for adding gases, thief sample cups used for metal purity and/or composition analysis, and turbulent-flow areas of aluminum processing to prevent refractory wear or erosion. Alternatively, a coating of the present invention may be formed on aluminum dross or other nonferrous metal recycling and removal devices, such as dross press heads, handheld skimmers, dross buggies, dross presses, skim booms, and other components used with dross collection or removal.

Additionally, the bulk paints, dry powder mixtures, coatings, and methods of the present invention may be used in connection with general glass manufacturing. For example, a coating of the present invention may be formed on metal chute tubes that feed molten glass into glass molds to reduce friction, metal wear and erosion. The bulk paints, dry powder mixtures, coatings, and methods of the present invention may be used in connection with automobile windshield glass. For example, the coatings may be applied to drape-forming metal mold-rings or metal frame, or drape-forming of art glass using stainless molds. The bulk paints, dry powder mixtures, coatings, and methods of the present invention may be used in connection with superplastic forming and isothermal forging. For example, the coatings may be formed on the mold to extend mold durability and to eliminate the need for a separate coating. The bulk paints, dry powder mixtures, coatings, and methods of the present invention may be used in connection with extrusion of metals, such as aluminum, in either front or back extrusion processing. For example, the bulk paint or dry powder mixture may be applied to form a coating on extrusion dummy blocks, die or tooling faces, ram noses, and tool scoops to provide permanent lubrication. The bulk paints, dry powder mixtures, coatings, and methods of the present invention may be used in connection with robotic and laser welding, such as to prevent weld spatter from accumulating on the metal welding plates. The bulk paints, dry powder mixtures, coatings, and methods of the present invention may be used as a flash nonstick shield for evaporative metal coating. For example, a coating may be formed on a metal plate to prevent adherence of evaporated metal during setup of thin-film deposition vacuum-coating systems. The bulk paints, dry powder mixtures, coatings, and methods of the present invention may be used in connection with galvanizing metal coating. For example, a coating may be formed on the dipping cages pursuant to the methods of the present invention to eliminate sticking of zinc. Additionally, a coating may be formed on the metal rolls used for galvanizing metal sheets pursuant to the methods of the present invention to prevent adherence to the rolls. The teachings of the present invention may also be used to form release coatings for permanent molds for forming cement based products.

The bulk paints, dry powder mixtures, coatings, and methods of the present invention may be used in connection with chimney flues to stop the accumulation of creosote, commercial smokers or barbeque cookers to stop adherence of grease, and exhaust mufflers, couplers, and manifolds of lawnmowers, automobiles, racecars, and small airplanes to prevent rusting and deterioration. Alternatively, additional components may be added to the bulk paint or dry powder mixture, such as $ZrO_2$, to form coatings that insulate the manifold for higher performance. The bulk paints, dry powder mixtures, coatings, and methods of the present invention may be used in connection with gun barrels to improve firing velocity by reducing friction from the barrel walls, turbine blades to improve performance, frying pans and industrial waffle makers to improve nonstick properties and extend the durability and performance, gas burner components to minimize corrosion from gases, valve seats for valves where cavitation occurs to decrease wear and erosion and increase durability and performance, and bearings to improve performance, decrease friction, and increase durability.

The bulk paints, dry powder mixtures, coatings, and methods of the present invention may be used in connection with high-temperature furnace walls to yield high emissivity, which typically increases furnace uniformity within the hot zone and increases the energy efficiency of the furnace. In one embodiment $CeO_2$, $HfO_2$, or other additives may be incorporated for use in connection with furnace walls. The teachings of the present invention may be used to form coatings on superalloys and other metals to improve resistance to gases, oxidation, or slags. Additionally, the bulk paints, dry powder mixtures, coatings, and methods of the present invention may be used in connection with plastic or ceramic extruder dies, screws, feed parts, and/or barrels in regions where erosion is common to decrease wear, erosion, and friction and increase performance and durability. The teachings of the present invention may also be used to form coatings that cover surface defects, such as on steel parts, to reduce sticking, improve surface finish, and increase the durability of such parts.

The teachings of the present invention may be used to form coatings on metal parts that are exposed to water or salt-water to decrease corrosion, solar panels to provide high emissivity and corrosion resistance, flexible circuits, such as flexible printed circuits and connectors, to provide an electrically insulating topcoat, and high temperature furnace metal parts and components, such as trays, belts, rollers, and conveyors to minimize corrosion, erosion, and unwanted sticking.

The coatings of the present invention have similar properties to and may be used in place of vitreous and porcelain enamels. For example, the coatings of the present invention may preferably be used in connection with home related products, such as baths, washing machines, dishwashers, heaters, fire places, gas and electric cookers, grills, clock faces, and cookware; hot water services; storage tanks; car exhaust systems; printed circuits; heat exchangers; street signs; railway signs; nostalgia signs and murals; and building industry products, such as interior and exterior architectural panels, fascias, spandrels, and partitions. The coatings of the present invention however may be flexible and may not require the undercoat and overcoat preparation that is necessary for vitreous enamels.

Because of the flexible properties of certain embodiments of the coatings of the present invention, such coatings may be uniquely used on products subjected to vibration, twisting, and/or bending motions at moderate to high temperatures. For example, the coatings of the present invention may be used in connection with metal bellows, metal coils, metal springs, metal expansion joints, metal tubing, hosing, and recuperators, and other devices subjected to severe conditions and therefore requiring robust materials that are tough, erosion-resistant, corrosion-resistant, and flexible. These coatings can be formed on metal textiles/fabrics to achieve a tough, flexible protective coating with lubricity and non-squeak/non-squeal characteristics (particularly when boron nitride is incorporated in the coating).

Heat resistant materials composed of ceramic and sintered metal (also known as cermets) may be formed by infiltration of porous metal preform with the bulk paint or dry powder mixtures of the present invention, which may then be heated as set forth herein so that the coating bonds into the pores of the cermet. Further the coatings of the present invention may be used to bond metal substrates together.

When applied to a metal surface, the bulk paints and dry powder mixtures of the present invention form coatings that preferably provide protection against oxidation and other gases that may corrode metal surfaces. Further, the coatings of the present invention that incorporate boron nitride typically provide release, nonstick, and nonwetting properties as well as lubricity and non-squeak/non-squeal properties. Additionally, thermally insulating additives and fillers, such as zirconium oxide, yttrium oxide, and/or cerium oxide, may be incorporated into the bulk paints and dry powder mixtures of the present invention to increase the thermal insulation properties of the coatings of the present invention. Alternatively, thermally conductive additives and fillers, such as boron nitride and/or aluminum oxide, may be incorporated to increase the thermal conductivity properties of the coatings of the present invention.

The coatings of the present invention may be electrically non-conductive (i.e., electrical insulators). However, additions of electrically conductive ingredients may allow at least some electrical conductivity as desired.

The bulk paints and dry powder mixtures of the present invention preferably creates a dense, flexible, hard, tough, and abrasion-resistant coating. Additionally, because additives and fillers may be incorporated into the bulk paint and dry powder mixtures of the present invention, the coatings are preferably capable of being tailored to meet a particular coating need. Moreover, because the bulk paints of the present invention may be painted on a surface, dried, and heated to fuse to the surface, the coatings and methods of the present invention have many advantages over other surface modification technologies and coatings such as thermal spraying (i.e., plasma spraying, flame spraying) and chemical vapor deposition. For example, the coating methods of the present invention are significantly more economical than most other surface modification technology processes.

While various embodiments and examples of this invention have been described above, these descriptions are given for purposes of illustration and explanation, and not limitation. Variations, changes, modifications, and departures from the compositions, systems, and methods disclosed above may be adopted without departure from the spirit and scope of this invention. In fact, after reading the above description, it will be apparent to one skilled in the relevant art(s) how to implement the invention in alternative embodiments. Thus, the present invention should not be limited by any of the above described exemplary embodiments.

Further, the purpose of the Abstract is to enable the various Patent Offices and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

What is claimed is:

1. A method of forming a ceramic composition based coating on a metal substrate, the method comprising the steps of:
providing a boron nitride bulk paint system, wherein the bulk paint system comprises boron nitride powder;
providing a metal substrate;
applying the bulk paint system to the metal substrate to form a painted substrate;
oxidizing boron nitride from the bulk paint system by heating the painted substrate in an air atmosphere at a temperature of at least 800° Celsius for at least one hour; and forming a coating on the metal substrate, wherein the coating comprises a $R_2O$—$SiO_2$—$B_2O_3$ composition, and wherein $R_2O$ is an alkali metal oxide.

2. The method of forming a ceramic composition based coating on a metal substrate of claim 1, wherein the boron nitride bulk paint system comprises:

48-56 weight percent potassium silicate solution;
12-14 weight percent boron nitride powder; and
30-40 weight percent water having 1-5 weight percent cellulosic suspender.

3. The method of forming a ceramic composition based coating on a metal substrate of claim 1, wherein the step of oxidizing boron nitride from the bulk paint system by heating the painted substrate in an air atmosphere is at a temperature of 800-1200° Celsius for no more than four days.

4. The method of forming a ceramic composition based coating on a metal substrate of claim 1, wherein 18-22 weight percent of the boron nitride powder of the bulk paint system is unoxidized.

5. The method of forming a ceramic composition based coating on a metal substrate of claim 1, wherein the boron nitride powder is completely oxidized from the bulk paint system.

6. The method of forming a ceramic composition based coating on a metal substrate of claim 1, further comprising the steps of:

providing additional oxides or nitrides selected from the group consisting of boron nitride, silicon nitride, zirconium oxide, aluminum oxide, cerium oxide, magnesium aluminate, aluminum titanate, yttrium oxide, and hafnium oxide, and combining such additional oxides and/or nitrides with the boron nitride bulk paint system to form a modified bulk paint system for application to the metal substrate.

7. The method of forming a ceramic composition based coating on a metal substrate of claim 6, wherein the additional oxides or nitrides are 20-50 weight percent of the modified bulk paint system.

8. The method of forming a ceramic composition based coating on a metal substrate of claim 1, further comprising the step of processing the boron nitride bulk paint system before applying to the metal substrate.

9. The method of forming a ceramic composition based coating on a metal substrate of claim 8, wherein the step of processing the boron nitride bulk paint system comprises:

(1) milling the bulk paint system;
(2) heating the bulk paint system to between 800-1300° Celsius and then grinding; or
(3) calcining the bulk paint system at 600-700° Celsius to form a calcined system and then grinding the calcined system.

10. The method of forming a ceramic composition based coating on a metal substrate of claim 1, wherein the $R_2O$—$SiO_2$—$B_2O_3$ composition comprises:

between 2 to 30 weight percent $R_2O$, wherein $R_2O$ is an alkali metal oxide;
between 10 to 74 weight percent $SiO_2$; and
between 23 to 79 weight percent $B_2O_3$.

* * * * *